(12) United States Patent
Yusuf et al.

(10) Patent No.: US 10,657,801 B2
(45) Date of Patent: May 19, 2020

(54) PREDICTING TEMPERATURE RISE EVENT

(71) Applicant: STS Defence Limited, Gosport, Hampshire (GB)

(72) Inventors: Syed Yusuf, Gosport (GB); David Garrity, Gosport (GB)

(73) Assignee: STS Defence Limited, Gosport, Hampshire (GB)

( * ) Notice: Subject to any disclaimer, the term of this patent is extended or adjusted under 35 U.S.C. 154(b) by 0 days.

(21) Appl. No.: 15/735,338

(22) PCT Filed: Jun. 2, 2017

(86) PCT No.: PCT/GB2017/051586
§ 371 (c)(1),
(2) Date: Dec. 11, 2017

(87) PCT Pub. No.: WO2017/212225
PCT Pub. Date: Dec. 14, 2017

(65) Prior Publication Data
US 2019/0012904 A1    Jan. 10, 2019

(30) Foreign Application Priority Data
Jun. 8, 2016    (GB) .................... 1610022.4

(51) Int. Cl.
G08B 23/00    (2006.01)
G08B 31/00    (2006.01)
(Continued)

(52) U.S. Cl.
CPC ............ G08B 31/00 (2013.01); A62B 17/003 (2013.01); G06N 3/0481 (2013.01); G06N 3/084 (2013.01);
(Continued)

(58) Field of Classification Search
CPC ..................................................... G08B 31/00
See application file for complete search history.

(56) References Cited

U.S. PATENT DOCUMENTS 5,973,602 A * 10/1999 Cole, III ............. A41D 31/085
340/584
6,118,382 A    9/2000 Hibbs et al.
(Continued)

FOREIGN PATENT DOCUMENTS

EP    0 801 368    2/2003
EP    1 296 745    9/2012
(Continued)

OTHER PUBLICATIONS

International Search Report and Written Opinion of the ISA PCT/GB2017/051586, dated Nov. 17, 2017, 7 pages.
(Continued)

*Primary Examiner* — An T Nguyen
(74) *Attorney, Agent, or Firm* — Nixon & Vanderhye P.C.

(57) ABSTRACT

A method is provided for predicting occurrence of a temperature rise event caused by a fire within an environment. The method comprises receiving temperature data captured by at least one temperature sensor 6, 8 for sensing an ambient temperature in the environment, processing the temperature data captured by the at least one temperature sensor in a previous window of time using a trained machine learning model 16 to determine a risk indication indicating risk of the temperature rise event occurring in a future window of time, and outputting a warning indication in dependence on the risk indication determined using the machine learning model. This is useful for providing firefighters with advance warning of dangerous temperature rises such as flashover events.

16 Claims, 12 Drawing Sheets

(51) Int. Cl.
- *G08B 17/06* (2006.01)
- *G08B 21/18* (2006.01)
- *A62B 17/00* (2006.01)
- *G06N 3/04* (2006.01)
- *G06N 3/08* (2006.01)
- *G06F 1/16* (2006.01)

(52) U.S. Cl.
CPC ........... *G08B 17/06* (2013.01); *G08B 21/182* (2013.01); *G06F 1/163* (2013.01)

(56) References Cited

U.S. PATENT DOCUMENTS

| | | | |
|---|---|---|---|
| 6,417,774 B1* | 7/2002 | Hibbs | A62B 9/00 340/584 |
| 6,472,988 B1 | 10/2002 | Feld et al. | |
| 6,700,497 B2 | 3/2004 | Hibbs et al. | |
| 6,868,697 B2 | 3/2005 | Baum et al. | |
| 6,995,665 B2 | 2/2006 | Appelt et al. | |
| 7,073,351 B2 | 7/2006 | Baum et al. | |
| 7,287,400 B1 | 10/2007 | Baum et al. | |
| 7,676,280 B1* | 3/2010 | Bash | H05K 7/20836 700/17 |
| 8,085,144 B2 | 12/2011 | Appelt et al. | |
| 8,400,292 B2 | 3/2013 | Kummetz | |
| 8,554,703 B1* | 10/2013 | Lin | G06N 20/00 706/12 |
| 8,638,214 B2 | 1/2014 | Kummetz | |
| 9,000,911 B2 | 4/2015 | Kummetz | |
| 9,625,324 B1* | 4/2017 | Lamie | G01K 1/024 |
| 2002/0135488 A1 | 9/2002 | Hibbs et al. | |
| 2003/0058100 A1 | 3/2003 | Jumpertz | |
| 2003/0065409 A1* | 4/2003 | Raeth | G05B 9/02 700/31 |
| 2003/0158635 A1 | 8/2003 | Pillar et al. | |
| 2004/0004547 A1* | 1/2004 | Appelt | G08B 21/02 340/573.1 |
| 2004/0131498 A1 | 7/2004 | Kuutti | |
| 2005/0001728 A1* | 1/2005 | Appelt | G08B 21/02 340/573.1 |
| 2006/0006997 A1 | 1/2006 | Rose-Pehrsson et al. | |
| 2006/0125623 A1* | 6/2006 | Appelt | A61B 5/02055 340/521 |
| 2006/0270471 A1 | 11/2006 | Matthiessen et al. | |
| 2007/0080817 A1 | 4/2007 | Grilliot et al. | |
| 2007/0103292 A1* | 5/2007 | Burkley | G07C 9/28 340/539.13 |
| 2007/0176770 A1 | 8/2007 | Shrode | |
| 2007/0205886 A1 | 9/2007 | Huseth et al. | |
| 2007/0205903 A1* | 9/2007 | diMarzo | A62B 99/00 340/573.1 |
| 2007/0241261 A1 | 10/2007 | Wendt | |
| 2008/0106437 A1* | 5/2008 | Zhang | A62C 3/08 340/945 |
| 2008/0146895 A1* | 6/2008 | Olson | G08B 21/0453 600/301 |
| 2008/0221741 A1 | 9/2008 | Pillar et al. | |
| 2009/0184244 A1 | 7/2009 | Drews et al. | |
| 2009/0207852 A1 | 8/2009 | Greene et al. | |
| 2010/0081411 A1 | 4/2010 | Montenero | |
| 2010/0219956 A1 | 9/2010 | Greco et al. | |
| 2010/0315228 A1 | 12/2010 | Grilliot et al. | |
| 2011/0042109 A1 | 2/2011 | Bouthiette et al. | |
| 2011/0140913 A1 | 6/2011 | Montenero | |
| 2011/0210843 A1 | 9/2011 | Kummetz | |
| 2011/0265706 A1* | 11/2011 | Nicholls | A41D 19/0027 116/201 |
| 2012/0146787 A1 | 6/2012 | Bose et al. | |
| 2013/0147621 A1 | 6/2013 | Kwong | |
| 2013/0300535 A1 | 11/2013 | Gorman | |
| 2013/0335235 A1 | 12/2013 | Carr et al. | |
| 2013/0342361 A1 | 12/2013 | Greene et al. | |
| 2014/0203938 A1 | 7/2014 | McLoughlin et al. | |
| 2014/0373601 A1* | 12/2014 | Menage | G01N 15/0826 73/38 |
| 2014/0375459 A1 | 12/2014 | Curtis et al. | |
| 2015/0097687 A1* | 4/2015 | Sloo | G06T 7/70 340/632 |
| 2015/0112883 A1 | 4/2015 | Orduna et al. | |
| 2015/0119079 A1 | 4/2015 | Tarlazzi et al. | |
| 2015/0124850 A1 | 5/2015 | Parthasarathy | G01N 25/72 374/4 |
| 2016/0006953 A1* | 1/2016 | Barbee | G08B 7/066 348/164 |
| 2016/0049071 A1 | 2/2016 | Beaver et al. | |
| 2016/0081415 A1* | 3/2016 | Handshaw | A42B 3/046 2/5 |
| 2016/0089552 A1 | 3/2016 | Murray et al. | |
| 2016/0124475 A1* | 5/2016 | Chandra | G06F 1/3234 700/300 |
| 2017/0169683 A1* | 6/2017 | Ryder | G08B 29/188 |
| 2017/0206464 A1* | 7/2017 | Clayton | G06N 99/005 |
| 2017/0251933 A1* | 9/2017 | Braun | G06F 1/163 |
| 2017/0261380 A1* | 9/2017 | Cher | G01K 7/42 |
| 2017/0278375 A1* | 9/2017 | Galin | G01K 3/005 |
| 2017/0330437 A1* | 11/2017 | Hatanaka | G08B 21/02 |
| 2018/0233019 A1 | 8/2018 | Werronen | G08B 25/016 |
| 2018/0293864 A1* | 10/2018 | Wedig | G08B 19/005 |
| 2019/0012904 A1* | 1/2019 | Yusuf | G06N 3/084 |

FOREIGN PATENT DOCUMENTS

| | | |
|---|---|---|
| GB | 2 427 732 | 1/2007 |
| JP | 2004-102634 | 4/2004 |
| WO | WO 2010/034547 | 4/2010 |

OTHER PUBLICATIONS

Combined Search and Examination Report of GB161022.4, dated Aug. 12, 2016, 7 pages.

* cited by examiner

PREDICTING TEMPERATURE RISE EVENT

This application is the U.S. national phase of International Application No. PCT/GB2017/051586 filed Jun. 2, 2017 which designated the U.S. and claims priority to GB Patent Application No. filed 1610022.4, filed Jun. 8, 2016, the entire contents of each of which are hereby incorporated by reference.

The present technique relates to the field of firefighting. More particularly, it relates to a method, apparatus and program for predicting an occurrence of a temperature rise event caused by a fire.

Safety is an important consideration for firefighters when attending to a fire. While current protective clothing for firefighters can deal with temperatures lower than around 300° C., temperatures during a fire can reach higher than this and can exceed 600° C. Above 300° C. charring of protective clothing begins and in the range 500 to 700° C. there is no chance of survival for any human beings in the vicinity of the fire. During the fire, the rate at which temperature increases can be highly non-linear and unpredictable, especially for a fire within an enclosed space such as a domestic room or office space. Due to the protective clothing worn by the firefighter it is difficult for the firefighter to sense the temperature increasing. The temperature can increase rapidly during the fire, especially in a condition known as "flashover" when combustible materials in the vicinity of the fire spontaneously ignite. It has been proposed to provide firefighters with a sensor for sensing ambient temperature which can trigger a warning if the temperature rises above a threshold. However, in practice by the time the temperature has risen above the threshold, the firefighter has little time to escape unharmed. Alternatively, the threshold could be set lower, but in this case the warning may be triggered some time before flashover actually occurs, and this may risk the firefighter leaving the scene of the fire prematurely reducing the chance of rescuing others from the fire. Therefore, a threshold-based approach may not provide an adequate warning of temperature rises.

At least some examples provided a method for predicting occurrence of a temperature rise event caused by a fire within an environment, comprising:
receiving temperature data captured by at least one temperature sensor configured to sense an ambient temperature within the environment;
processing the temperature data captured by the at least one temperature sensor in a previous window of time using a trained machine learning model to determine a risk indication indicative of a risk of the temperature rise event occurring in the environment in a future window of time: and
outputting a warning indication in dependence on the risk indication determined using the machine learning model.

At least some examples provide an apparatus comprising processing circuitry configured to perform the method discussed above.

At least some examples provide a program comprising instructions to control a data processing apparatus to perform the method described above.

At least some examples provide a firefighter protection apparatus comprising:
at least one temperature sensor configured to sense an ambient temperature within an environment surrounding the apparatus; and
processing circuitry configured to process the temperature data captured by the at least one temperature sensor in a previous window of time using a trained machine learning model to determine a risk indication indicative of a risk of a temperature rise event occurring in the environment in a future window of time, and to control output of a warning indication in dependence on the risk indication determined using the machine learning model.

Further aspects, features and advantages of the present technique will be apparent from the following description of examples, which is to be read in conjunction with the accompanying drawings, in which.

Figure 3:
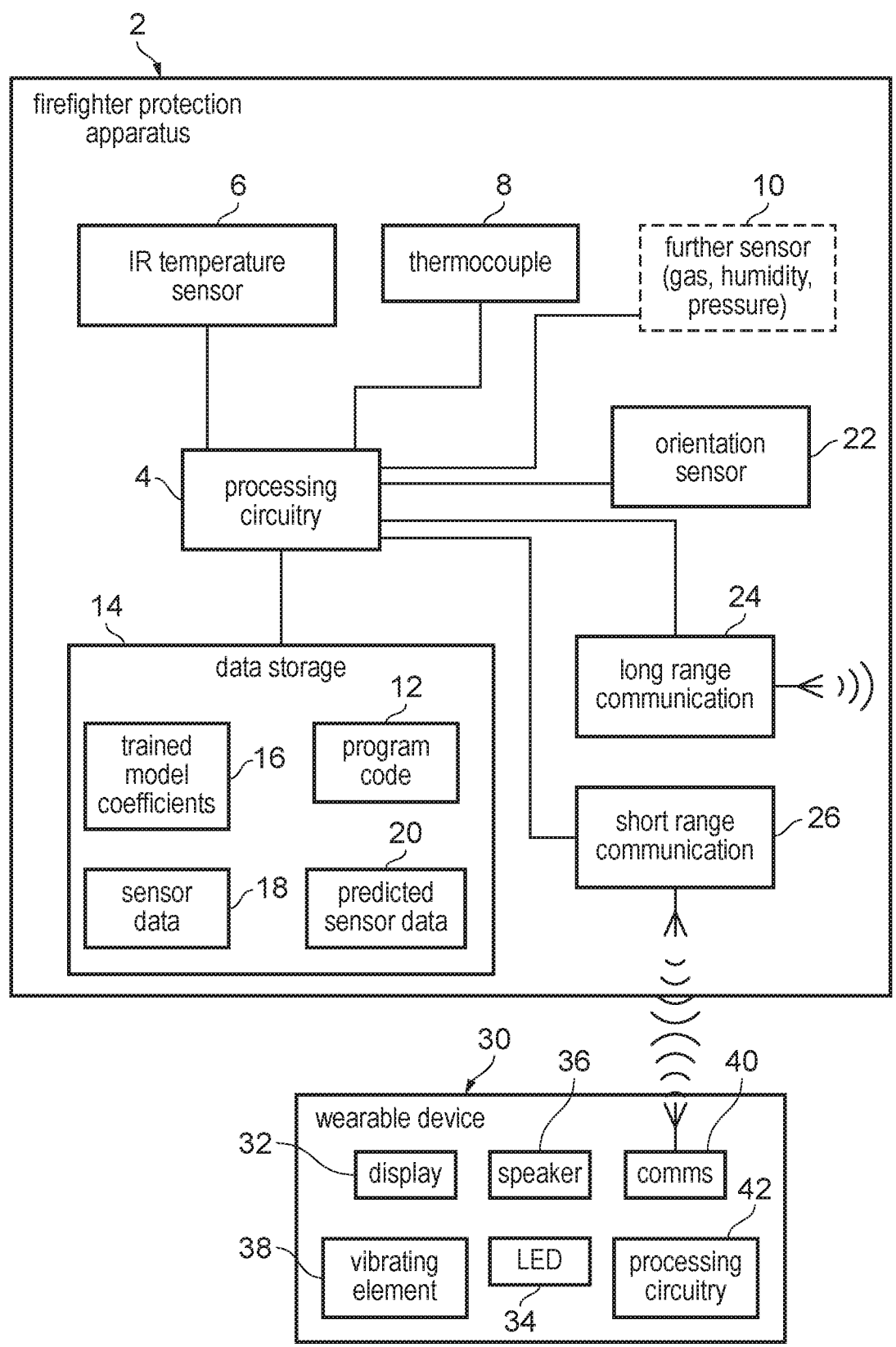
Figure 4:
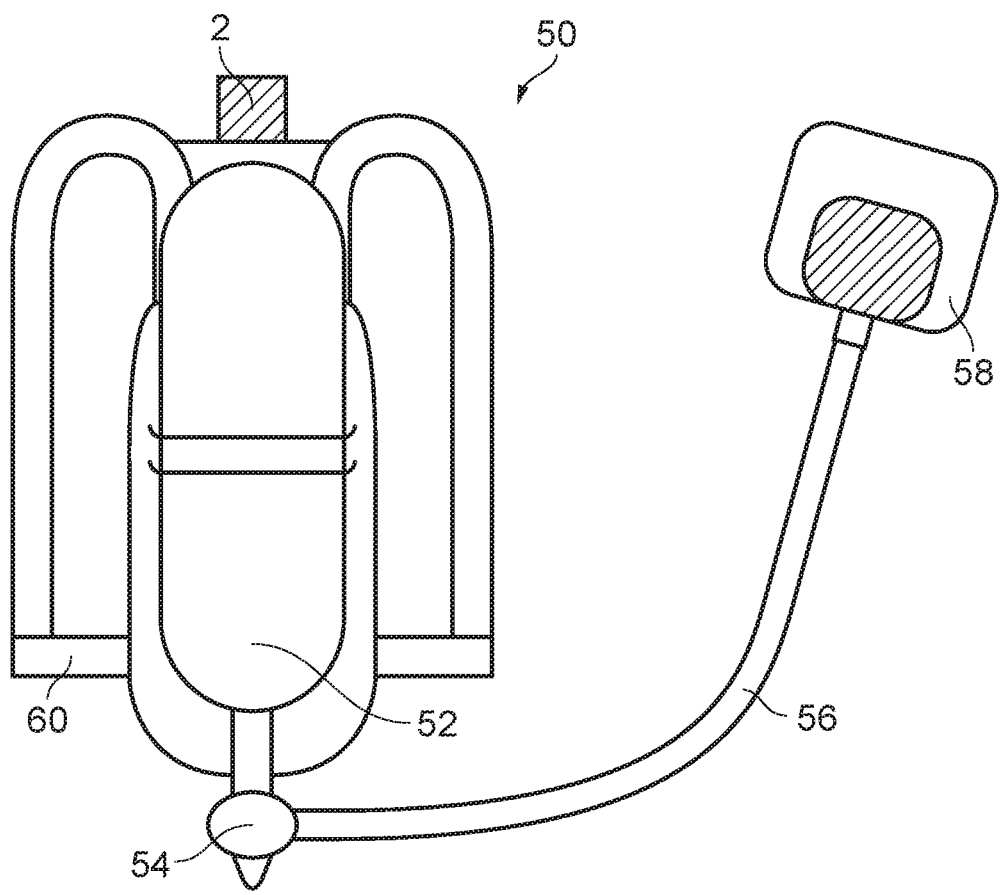
Figure 5:
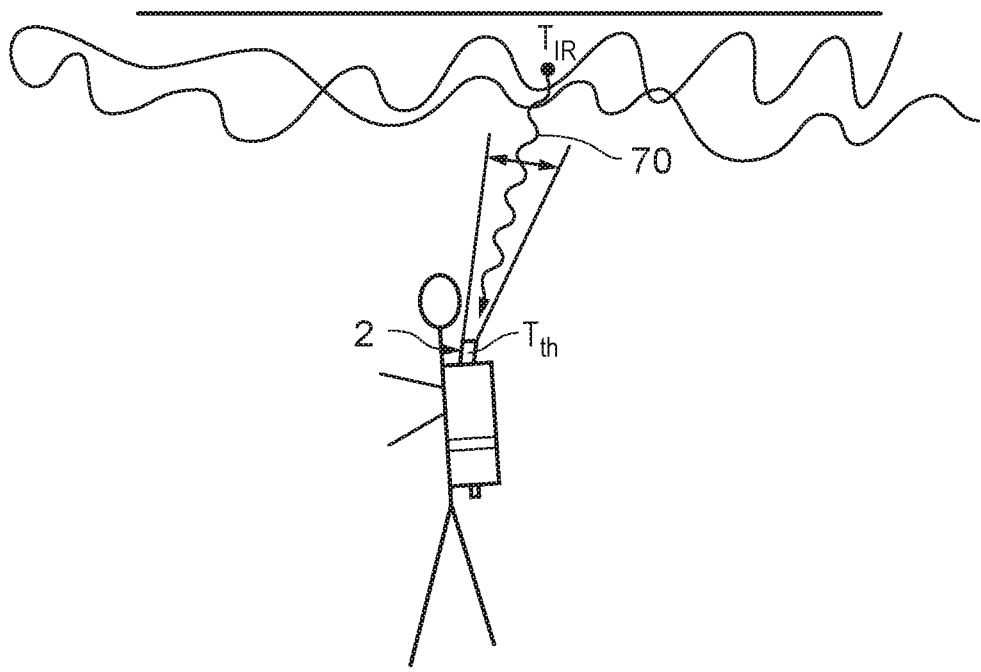
Figure 6:
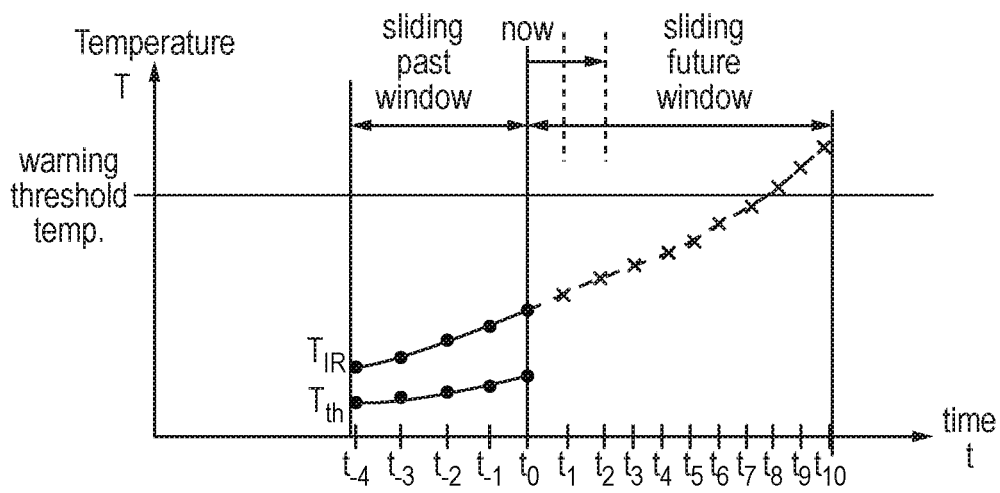
Figure 7:
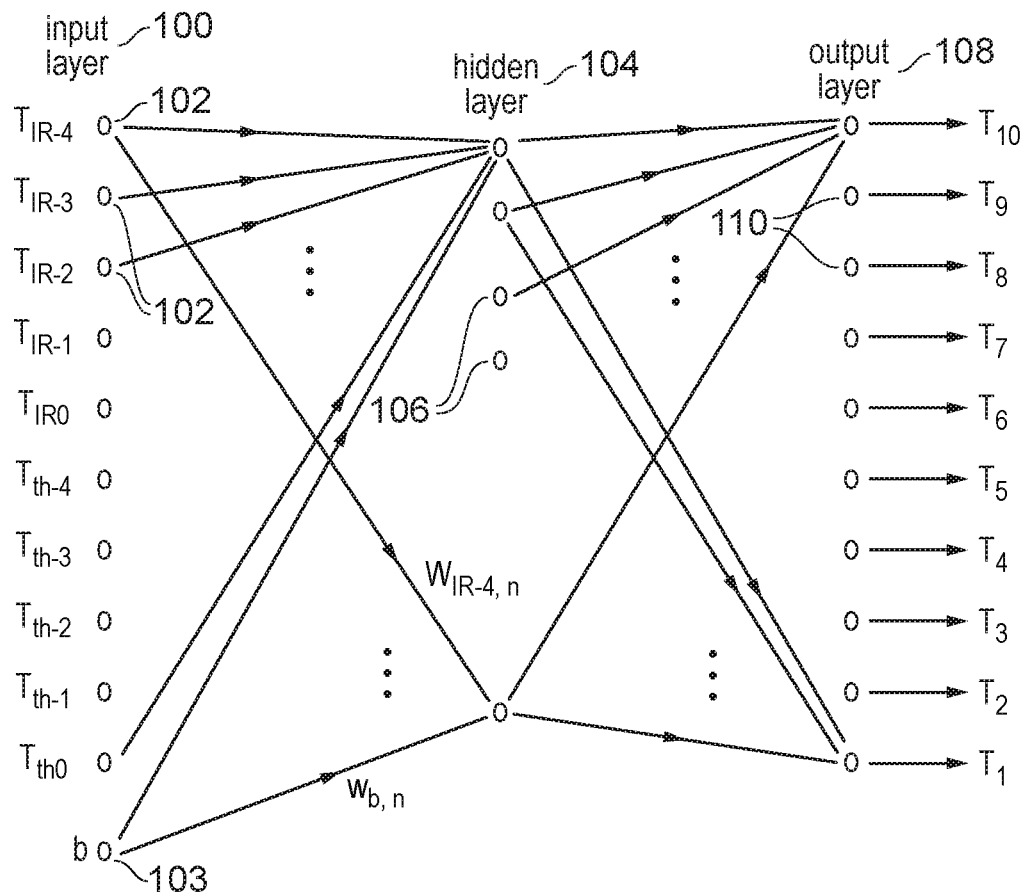
Figure 16:
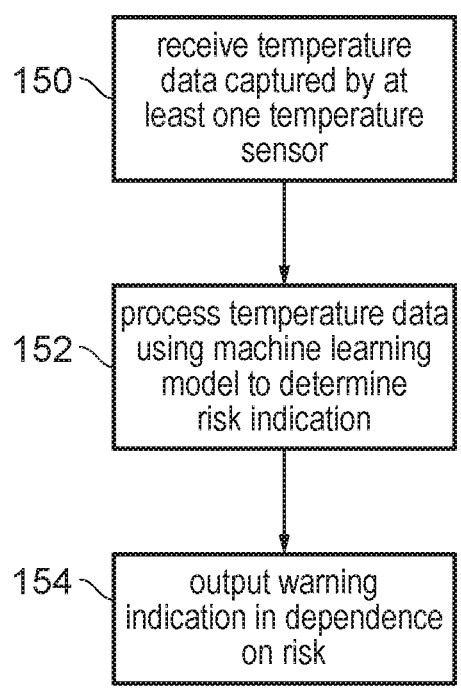
Figure 17:
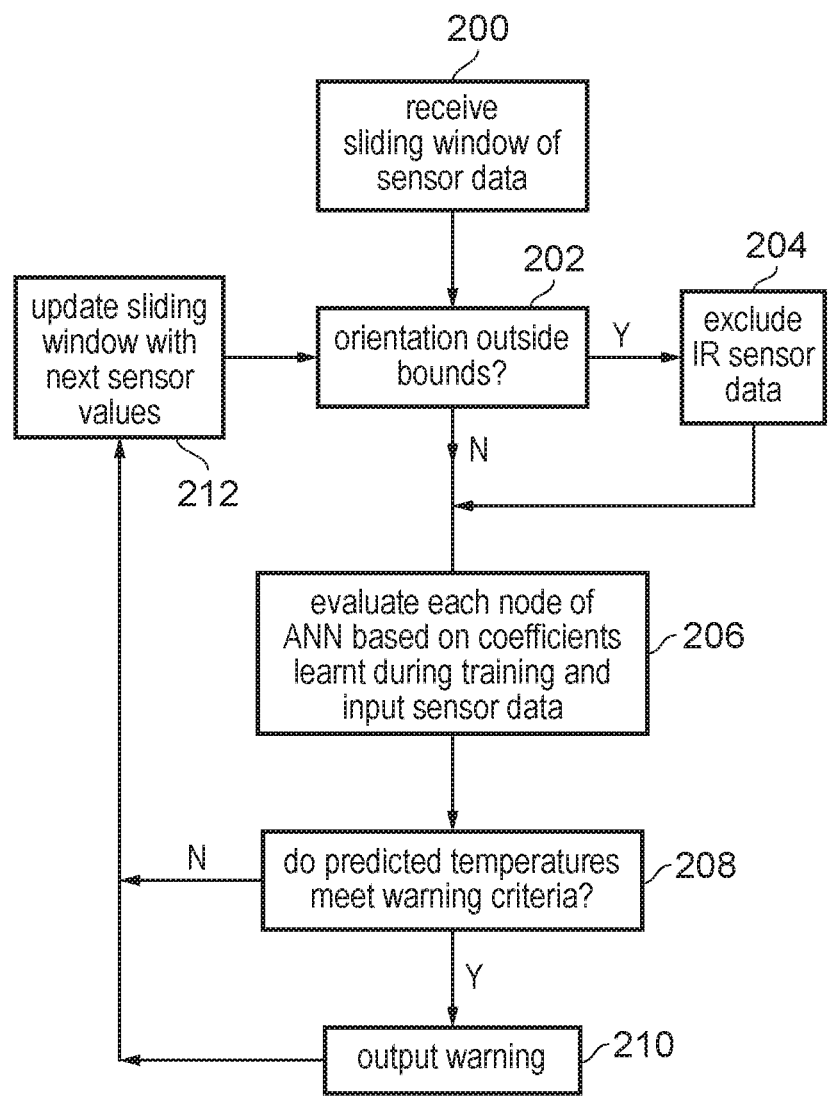
Figure 18:
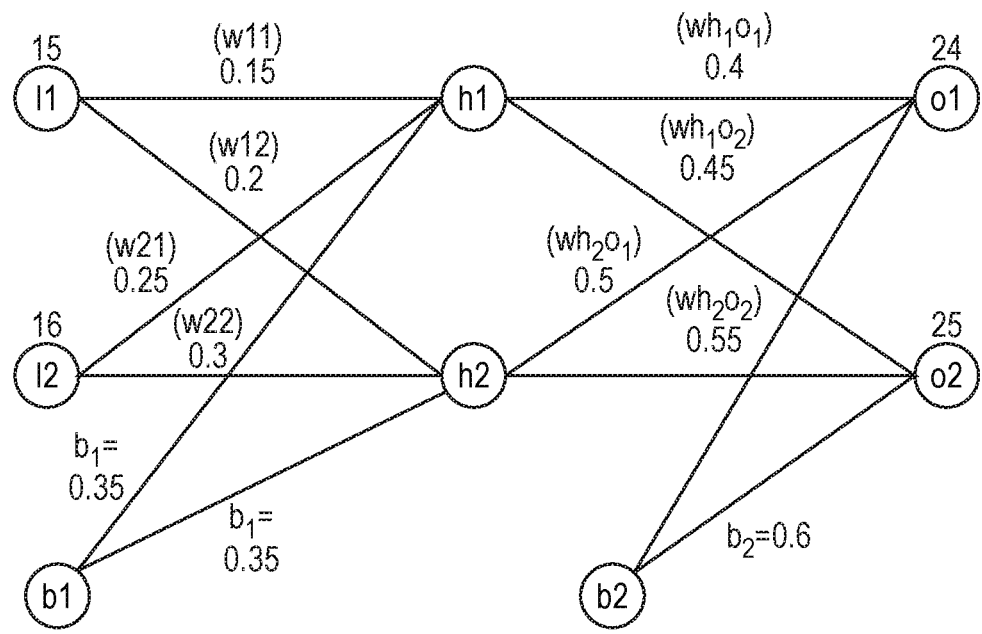
Figure 19:
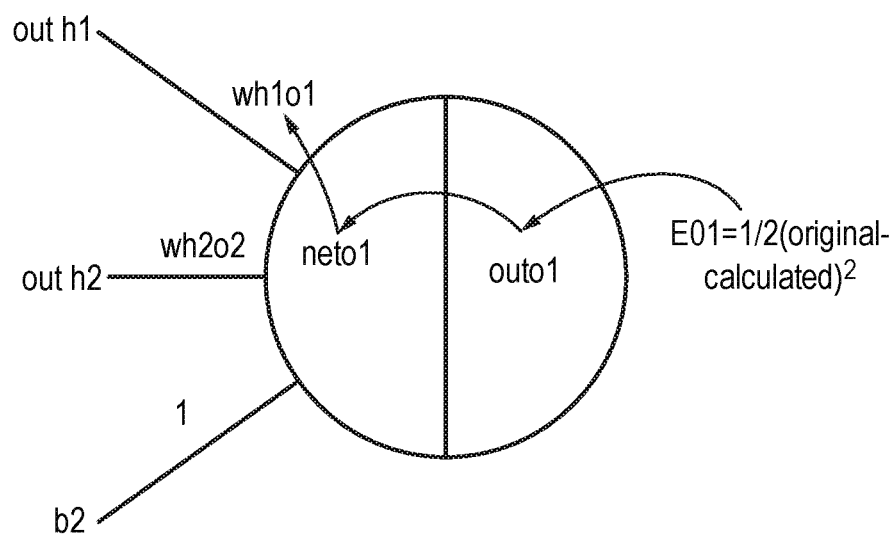
Figure 20:
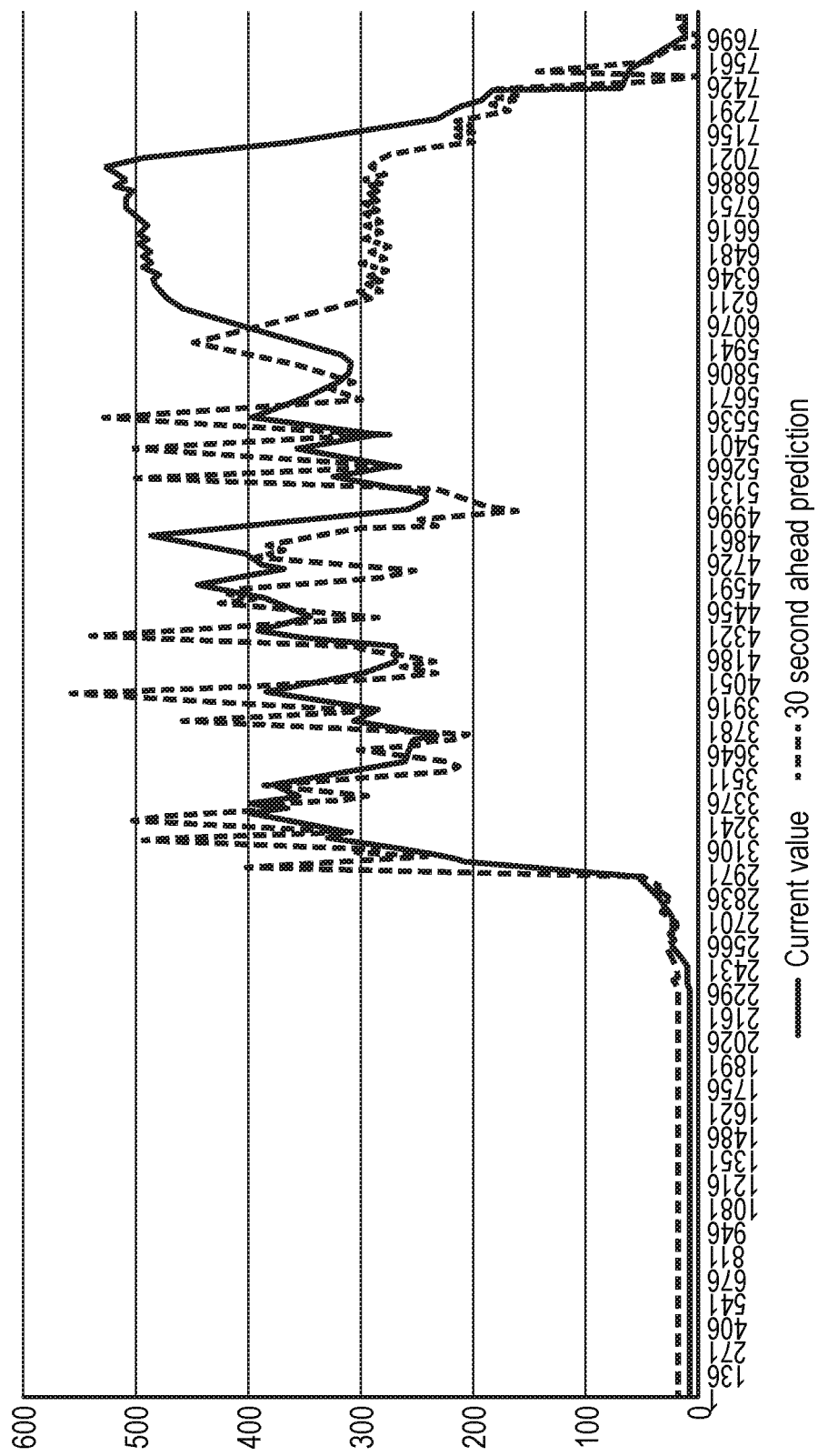

FIG. 3 schematically illustrates an example of a firefighter protection apparatus and a wearable device;

FIG. 4 shows an example of a breathing apparatus on which the firefighter protection apparatus can be mounted;

FIG. 5 shows an example of how the apparatus carried by a firefighter can record the ambient temperature at a ceiling level above the level of the firefighter;

FIG. 6 shows an example of predicting temperature values for a sliding future window of time based on temperature data recorded by the temperature sensors in a sliding past window of time;

FIG. 7 illustrates an example of using an artificial neural network for predicting future temperatures during a fire based on previously sensed temperatures;

FIGS. 8 to 15 show results of predicting temperatures at different heights in a room using a trained artificial neural network;

FIG. 16 is a flow diagram illustrating a method of predicting the occurrence of a temperature rise event;

FIG. 17 is a flow diagram illustrating an example of predicting the occurrence of a temperature rise event using a trained artificial neural network;

FIG. 18 shows a simplified example of a neural network to illustrate a process for training the network;

FIG. 19 illustrates an example of backpropagation to update weights during the training process; and FIG. 20 illustrates test results when the model is trained based on the temperature data captured by only a single temperature sensor.

A method is provided for predicting the occurrence of a temperature rise event caused by a fire within an environment. The method comprises receiving temperature data captured by at least one temperature sensor configured to sense an ambient temperature within the environment, processing the temperature data captured by the sensor in a previous window of time using a trained machine learning model to determine a risk indication indicative of a risk of a temperature rise event occurring in the environment in a future window of time, and outputting a warning indication in dependence on the risk indication determined using the machine learning model.

Hence, a machine learning model can be trained (e.g. based on temperature data measured in a previous fire) to recognise patterns of previous temperature measurements which indicate that there is a risk of the temperature rise event occurring in a future window of time. Based on the risk identified by the machine learning model, a warning can then be output, for example to signal that the firefighter should leave the environment of the fire to preserve their own safety. By using a trained machine learning model to predict future risk of temperature rises based on temperature sensor data from a previous window of time, greater advance warning of temperature rise events can be provided.

The predicted temperature rise event could be any desired pattern of temperature rise to be detected, such as whether temperature has reached a given temperature threshold, or whether the rate of change of temperature rise is greater than a given amount, or some other condition of interest. However, the present technique is particularly useful where the predicted temperature rise event comprises a flashover event. Flashover is a condition during a fire when combustible materials within the environment spontaneously ignite because the air temperature in the room exceeds the auto ignition temperature of those materials. Flashover can pose a significant risk to a firefighter's safety since it can cause a sudden increase in temperature beyond the maximum temperature which can be withstood by the safety clothing worn by the firefighter, and so providing advance warning of a flashover event occurring can be valuable for ensuring the safety of the firefighters.

The processing using the trained machine learning model based on the temperature data captured by the sensors may be repeated over time based on different windows of sensor data, to provide continuing updates on the risk of temperature rise event occurring. Hence, the trained machine learning model may be supplied with temperature data captured in successive sliding windows of time, and process each window of temperature data to determine a risk indication for corresponding future sliding windows of time. For example, the temperature values may be captured at a certain refresh rate, and the most recent J values may be input to the machine learning model, which may predict the risk indication for a future sliding window of time corresponding to a certain number K of subsequent temperature measurements. The processing of a single window of sensor data by the machine learning model may be completed within one refresh period of the sensor data, so that each time new sensor data is received the processing is ready to process it. In this way the risk indication is repeatedly updated, and the warning indication is output if it is determined that there is sufficient risk of the temperature rise event occurring in the future window of time.

In some cases the risk indication may comprise an indication of a one of a plurality or types of risk class, e.g. whether the risk of the temperature rise event is considered to be low, medium or high. Hence, in some examples the risk indication could simply be a qualitative estimation of risk. In this case, the warning indication could be output when the risk indication indicates one of the predetermined subsets of types of risk class, e.g. if the risk is considered high. This can still provide sufficient warning to the firefighter.

Alternatively, the risk indication could be a more quantitative indication such as the probability of the temperature rise event occurring.

However, it can be particularly useful for the risk indication to comprise one or more predicted temperature values predicted for the future window of time. Hence, rather than a mere indication of risk, the trained machine learning model can predict the actual temperature values expected to occur in future based on the previously monitored temperature data for the previous window of time. Predicting actual temperature values can be useful because it allows additional information to be determined other than the risk indication, e.g. the expected time until the temperature rise event occurs could be predicted.

When future temperature values are predicted by the model, the method may include determining whether the predicted temperature values satisfy a predetermined condition, and outputting the warning indication if the predetermined condition is satisfied. For example the predetermined condition could be whether the predicted temperature values include at least one value exceeding a temperature threshold (e.g. 500° C.), or whether a rate of change of the predicted temperature values with time exceeds a rate of change threshold.

Various types of machine learning model could be used for predicting the risk of the temperature rise event. For example the trained machine learning model could be a supervised machine learning model such as an artificial neural network (ANN), hidden Markov model (HMM), or support vector machine, or an unsupervised machine learning model such as clustering models (KNN) or random forest algorithms. The model can be trained by providing training data comprising a series of temperature data recorded by sensors during a monitored fire.

For example, during a training phase (performed in advance, not at the scene of the fire when the method is used in the field), initial model parameters, such as weights or coefficients used for combining the input sensor data to calculate the risk indication, may be selected, and an iterative approach may be used for refining the model parameters based on the training data. In each iteration, the training data may be split into windows, and each window of training data may be processed using the model defined by the current model parameters to predict a risk indication (either a qualitative risk class, or future temperature values) for a corresponding subsequent window of time. The risk indication predicted for each window can then be compared with the actual risk evaluated from the subsequently captured temperature values in the corresponding subsequent window (or the future temperature values themselves), to calculate an error. An overall error score for the iteration can be derived from the errors calculated for each window of training data (e.g. by averaging the error for each window). The model parameters can then be adjusted and another iteration performed to see whether the error score increases or decreases. Subsequent adjustments to the model parameters used for later iterations can then be made that tend to cause the error score to decrease (e.g. using a gradient descent algorithm or other optimization algorithm), and the process is iterated until the error score is less than a given threshold (e.g. a prediction error of less than 0.7% could be required). At this point, the model parameters used for the final iteration are saved as the model parameters to be used when the technique is subsequently used in the field. Hence, the patterns to be identified for evaluating the risk indication can be learnt automatically by a supervised or unsupervised machine learning approach, rather than being defined in advance by a human designer.

While many types of machine learning model are available, it can be particularly useful to use an artificial neural network as the trained machine learning model because an artificial neural network is better able to generalise predictions even in the presence of noise in the input data, for example ignoring outliers, and is able to make graduated predictions which can better estimate the risk.

In some cases the same trained machine learning model may be used for fires in all types of environment. However, different types of environments may have different characteristics, e.g. different patterns or rates with which temperature rises during the fire. For example, a fire in a domestic setting may behave differently to a fire on board a ship or submarine within a metal compartment due to the different materials or dimensions used for those environments. To provide more accurate predictions for the type of environment being dealt with, the trained machine learning model may be selected from multiple models associated with the different types of environment. The multiple models could be of different types (e.g. one HMM and one ANN), or could be of the same type (e.g. ANN) but with different model parameters learnt based on different training data captured in the respective types of environment. The selection between the candidate models could be based on stored configuration data set statically in advance for a given device (e.g. a given device may be designated for use in domestic or marine environments respectively, but could be switched by updating the configuration data if it is reallocated for a different environment). Alternatively, the selection could be based on a user input. For example, when attending the firefighter (or an operation controller managing the rescue operation) may press a button or provide input (which could be sent from a remote device separate from the device held by the firefighter) specifying what type of environment is being attended to. Another option would be to provide a dynamic selection of the model to use depending on automated detection of the type of environment, e.g. based on image recognition or machine vision for detecting based on a camera image properties which indicate the type of environment, or based on GPS or another location sensor, which could allow detection of whether the firefighter is on land or at sea for example.

Nevertheless, in many cases a single trained machine learning model may be sufficient, especially if the firefighter is generally expected to attend a certain type of fire most often. Hence, some embodiments may use a single trained model for all conditions.

The one or more temperature sensors used to gather the temperature data for inputting to the machine learning model may be implemented in different ways. In some cases at least one static temperature sensor could be used which is disposed at a static location within the environment of the fire. For example, this could be useful for certain environments such as commercial buildings (e.g. offices), public buildings (e.g. libraries or museums) or industrial premises (e.g. factories) could be fitted with one or more temperature sensors at various locations, which in the event of a fire can provide temperature data for use by the fire services to predict whether a temperature rise event is likely in the future.

However, often firefighters may attend a fire within an environment which has not been instrumented with such temperature sensors. For example, it may be relatively unlikely that a domestic home may have such temperature sensors fitted. Therefore, it can be useful to use at least one body-worn temperature sensor which is disposed on a body-worn device within the environment. Hence, the firefighter can wear the body-worn device to carry their own temperature sensors into the environment of the fire, which gather temperature data to be input into the trained machine learning model for evaluating the risk of the temperature rise event occurring. For example, the body-worn device could comprise clothing worn by a firefighter, a helmet or face guard worn by the firefighter, or any other device or item which can be physically attached to the firefighter so as to move with the firefighter as the firefighter attends to the fire. However, it can be particularly useful for the temperature sensor to be mounted on a breathing apparatus used by the firefighter. Typically, firefighters entering a burning building may carry an oxygen supply to allow them to breathe in an environment containing potentially toxic fumes and low oxygen levels. Mounting the temperature sensor on the breathing apparatus ensures that the temperature sensor is unlikely to be forgotten (as the firefighter would generally carry the breathing apparatus), and also the breathing apparatus typically provides an area where the sensor can be mounted which is unlikely to get in the way of the firefighter's movement.

It can be useful for at least one temperature sensor to be provided for sensing the ambient temperature at a higher level in the environment than the level at which the firefighter is expected to be located, for example at ceiling height or another height above the level of the firefighter. This is because when a fire burns within a room, during an initial phase of the fire as the fire starts, hot gases and fumes from a burning object (such as a piece of furniture or waste bin) accumulate at the top of the room. As the fire progresses, more gases are released, and so the boundary between the hot gases above and cooler air below (known as the "neutral plane") gradually descends down towards the floor. Hence, at a given height, the temperature will tend to increase with time as the neutral plane passes it, and temperatures recorded at higher levels will tend to increase earlier than temperatures recorded at lower levels. Therefore, by providing a sensor for sensing the temperature at a relatively high level in the environment, such as near the ceiling of a room, the trained machine learning model may be able to provide more advanced warning of temperature rise conditions at levels lower down, such as the shoulder height for the firefighter.

There are a number of ways in which ceiling temperature measurements can be made. In the case of static sensors provided in advance within the environment of the fire, the sensors can simply be positioned at the required height. For example, a thermocouple or other type of "proximity" type temperature sensor for sensing temperature in the immediate vicinity of the sensor itself could be used. Alternatively, the temperature at ceiling height can be sensed using a temperature sensor which is physically situated at a lower height, such as on the body of the firefighter. This can be done using a remote temperature sensor which can sense the ambient temperature at a location remote from the location of the temperature sensor itself. For example, the remote temperature sensor may comprise an infrared temperature sensor which senses temperature based on infrared radiation which is incident on the sensor from the remote location. All objects radiate electromagnetic radiation (known as black body radiation) with an intensity and wavelength distribution dependent on the temperature of the object. The infrared temperature sensor may have optics for focussing infrared radiation from a given region onto the sensor, and the temperature at that region can be deduced from the intensity and/or wavelength of the infrared radiation detected. Hence, for the case of body-worn sensors it can be particularly useful for the at least one temperature sensor to include at least one infrared temperature sensor or other remote temperature sensor to allow temperatures above the firefighter to be measured. In the case of an infrared sensor, the orientation with which the sensor is mounted on the body-worn device may be such that when in use, the sensor points upwards.

In some embodiments, the machine learning model may determine the risk indication based on temperature data from a single temperature sensor in some embodiments. This approach may be particularly effective if the single sensor senses temperature at ceiling height, since the ceiling temperatures may provide greater lookahead time for predicting rises at the firefighter's level.

However, the accuracy and lookahead time of the prediction can be improved when multiple temperature sensors are provided for sensing ambient temperature at different heights within the environment. This allows the correlation between the temperature rises at different heights to be used by the model to identify patterns likely to indicate a risk of a temperature rise event. For example, the temperature rise at the firefighter's level tends to lag the temperature rise higher up, so considering multiple sensors at different heights can improve the robustness of the prediction and reduce sensitivity to noise in the sensing of a single sensor. Again, there a different ways in which temperature sensors could be arranged to sense temperature at different heights. In a static case the temperature sensors may simply be positioned at different heights in the instrumented environment. In the body-worn case, the firefighter could carry a device with multiple proximity temperature sensors spaced apart from one another at different vertical levels when the device is worn. For example, the firefighter could carry some kind of frame or support with a section that extends upwards to carry the temperature sensor for sensing temperature at a higher level. However, this may restrict the movement of the firefighter in some circumstances, and so it may be less intrusive to the firefighter to provide a device which has at least one proximity sensor (such as a thermocouple) for sensing temperatures at the level of the firefighter, and at least one remote sensor which senses temperature at a higher level but is situated at the level of the firefighter. This allows a more compact device to be provided.

In the case where the body-worn device comprises at least one remote temperature sensor, the location at which the temperature is sensed by the remote temperature sensor may depend on the orientation of the firefighter as they move through the building. For example, an infrared sensor may have a limited field of view, and if the firefighter has to tilt or crawl along the ground, the field of view of the sensor may no longer be pointing upwards. To address this, the method may include detecting periods when an orientation of the body-worn device is outside at least one predetermined limit, and excluding from the processing for determining the risk indication temperature data which is captured by the remote temperature sensor during those periods. For example, one or more inertial sensors such as an accelerometer, magnetometer or gyroscope may be used to sense the orientation of the device carrying the remote temperature sensor. The bound for the acceptable orientation could be for example that the remote temperature sensors should be pointing within a certain threshold (e.g. 20 degrees) of the vertical, and when the orientation of the body-worn device is such that the remote temperature sensor is pointing more horizontally than this threshold then such temperature data can be excluded.

In the periods when the orientation is outside the bounds, excluding the temperature data from the remote temperature sensor could result in no prediction being made for those periods. Alternatively, a prediction can still be made by substituting the temperature data of the remote temperature sensor with dummy data (e.g. the temperature that was previously measured in a valid period when the orientation was within the permitted bounds) or with interpolated data derived from the previously monitored data. Also, as discussed above some embodiments may already predict future temperature values using the machine learning model itself, so in this case the previously predicted future temperature values from the model could be substituted for the sensor data obtained at corresponding timings, during periods when the orientation is outside bounds. This allows predictions to continue even during periods when the orientation of the firefighter makes the remote temperature sensor data unreliable. In practice, the firefighter is likely to return to an upright position after a relatively short period, so that a short period of using predicted values instead of actual temperature values may not greatly reduce the accuracy of the model's prediction.

Temperature sensors need not be the only types of sensors used as inputs to the machine learning model. The model may also use sensor data captured by at least one further sensor which is arranged to sense a property of the ambient environment other than temperature. The trained machine learning model can use that further sensor data in combination with the temperature sensor data to determine the risk indication indicating the risk of the temperature rise event occurring. For example, the further sensor could be a gas sensor for sensing presence of one or more predetermined gases in the environment (such as carbon monoxide, sulphur dioxide, nitrogen oxides, or chlorine for example, which tend to be generated during a fire), a humidity sensor for sensing humidity in the environment, and/or a pressure sensor for sensing air pressure in the environment. Any combination of one or more of these types of further sensors could be provided. By providing additional information relating to the onset of the fire, more accurate predictions can be made by correlating changes in temperature against changes in other factors within the environment being monitored. Again, the further sensors may be static sensors or body-worn sensors being carried by the firefighter.

The warning indication for warning the firefighter when the temperature rise event is likely can be generated in different ways. For example, the warning could be an audible indication (e.g. an alarm sound or other noise), a visual indication such as a flashing light or display with a warning image or text, and/or a vibrating indication such as a buzzing action on a device worn by a firefighter which can be felt to make the firefighter aware of the risk. In general, any way of signalling to the firefighter that there is a risk of an imminent temperature rise can be used. It can be particularly useful to output the warning indication via a wearable device, which may not be the same device as the one carrying the temperature sensors or the processing circuitry for running the machine learning model. For example the wearable device could be a wrist-worn device such as a watch or bracelet, a body-worn device such as a vest, badge or piece of clothing, or a head-worn device such as a hat, helmet, facemask or heads up display. The wearable device may be in communication with the device carrying the sensing and processing circuitry via any known technique which could be wired or wireless. However, a wireless communication may be preferred to reduce the restriction on the firefighter's movements. For example, Bluetooth®, Wifi®, Zigbee® or another wireless communication protocol may be used.

In addition to warning the firefighter, the warning indication may also comprise a signal transmitted to a remote command centre which is remote from the environment of the fire itself. This can provide warning to the operation controller or other party monitoring the rescue operation to signal when their firefighter may be potentially in danger. Hence, the device carried by the firefighter could have longer range communication capability such as a cellular radio transmitter to communicate via cellular networks to the remote command centre.

An apparatus may have processing circuitry for performing the method discussed above. For example, the apparatus may have processing circuitry comprising either bespoke hardware (e.g. an field programmable gate array) or generic processing hardware executing software, for implementing the trained machine learning model. The apparatus need not include the temperature sensors itself. For example, in the case of a building which is fitted with static sensors, the apparatus providing the processing of the sensor data using the machine learning model may be a central processor or server, which receives sensor data captured by external sensors and returns a signal to the firefighter indicating the risk indication or a signal for triggering a warning to the firefighter.

A computer program may be provided comprising instructions for controlling a data processing apparatus to perform the method of receiving the temperature sensor data, using the trained machine learning model to evaluate the risk, and outputting a warning indication (which could simply be a signal to another device carried by the firefighter). The program may be stored on a recording medium, which could be transitory or non-transitory.

In other examples, a firefighter protection apparatus may be provided, intended to be carried by the firefighters at a scene of a fire. The firefighter protection apparatus may comprise at least one temperature sensor for sensing ambient temperature within the environment of the apparatus, and processing circuitry for running the trained machine learning model, determining the risk indication using the model and the sensor data from the at least one temperature sensor, and controlling output of a warning indication based on the risk indication. This type of device can be more generally applicable to any setting of the fire, since the firefighter can carry their own temperature sensing and temperature rise prediction functionality with them as they enter the location of the fire. Although it would be possible to provide an apparatus which gathers the temperature sensor data and outputs it to a separate server or other central processor to calculate the risk using the machine learning model, by providing such functionality on the firefighter protection apparatus itself, this reduces the risk to the firefighter since even if communications between the firefighter and the central location go down, the firefighter still has local processing circuitry for calculating the risk indication and providing a warning.

The firefighter protection apparatus could be any device carried by the firefighter, but it can be particularly useful to be a breathing apparatus, or a module adapted for attaching to a breathing apparatus. For example, a module may be provided for attaching to existing breathing apparatuses, with the enclosed module including the one or more temperature sensors and the processing circuitry (such as a microprocessor or other chip) for running the trained learning machine model. Alternatively, an integrated product comprising the breathing apparatus hardware and the at least one temperature sensor and processing circuitry for running the model may be provided.

Figure 1:
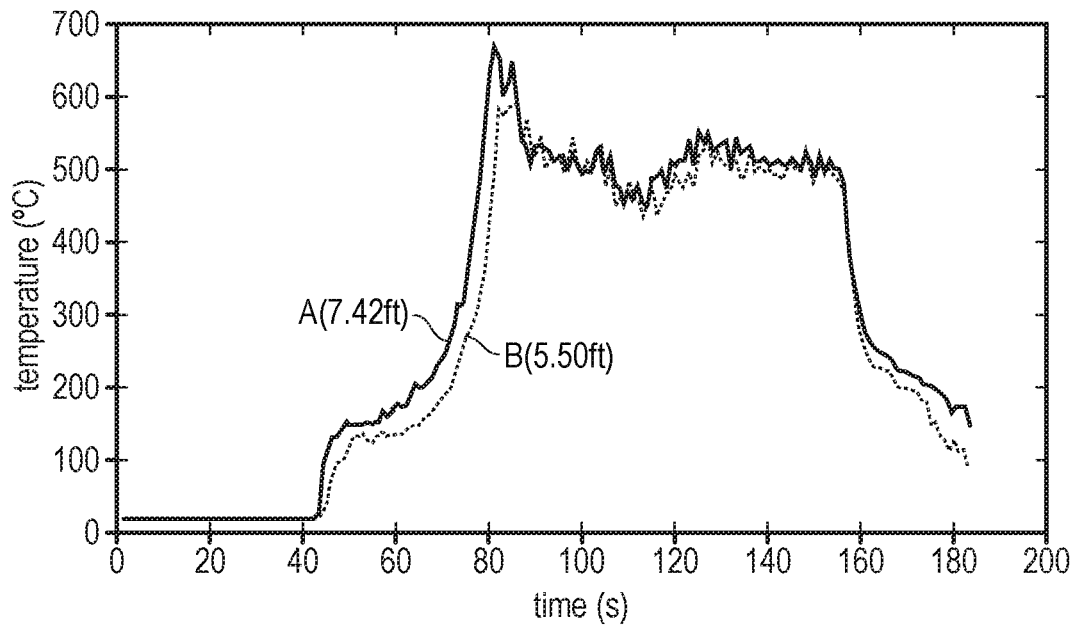
FIG. 1 is a graph showing a first example of variation in temperature recorded at two different heights within a room during a fire.
Figure 2:
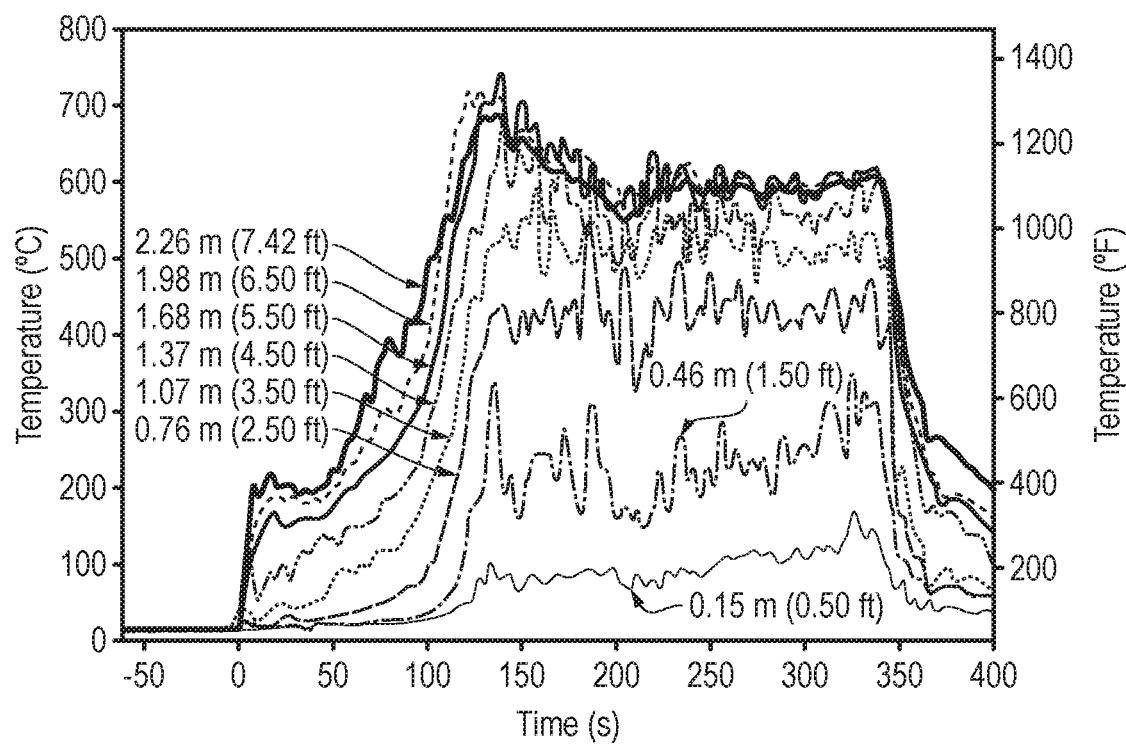
FIG. 2 is a graph showing a second example of variation in temperature recorded at eight different heights within a room during a fire.

FIG. 1 is a graph showing temperatures recorded over time during the course of a fire in a dining room. Line A shows the temperatures recorded near ceiling height (7.42 foot above the floor in this example), and line B shows the temperatures recorded at shoulder height for a typical firefighter (5.50 foot above the floor in this example). FIG. 2 shows corresponding data for another fire in a living room. The data for both fires was obtained based on a study by the National Institute of Standards and Technology (NIST). In addition to the data for the 7.42 foot and 5.50 foot sensors, FIG. 2 also shows variation in temperature recorded by further sensors at heights of 6.5, 4.5, 3.5, 2.5, 1.5 and 0.5 foot in the living room. While not shown in FIG. 1 to make the comparison between the 7.42 foot and 5.5 foot data clearer, the NIST data set for the dining room fire also includes data for sensors recorded at 6.5, 4.5, 3.5, 2.5, 1.5 and 0.5 foot in a corresponding way to FIG. 2. As can be seen in FIG. 2, the temperature rise occurs earlier at higher heights than at lower heights, and for a given temperature (e.g. 300° C.), the upper sensor reaches this temperature first, followed by each successively lower temperature as the neutral plane descends.

The following characteristics can be noticed in a room fire based on the NIST data:

1. In the dining room, when a temperature of 201° C. was recorded at near ceiling height (7.42 ft), this corresponds to a shoulder height (5.50 ft) temperature of 146° C.
2. It took about 24 seconds for the shoulder-height temperature sensor to report an increase to 206° C.
3. By this time (Stage 2), the ceiling temperature was already at 310° C. which increased to 494° C. in about 12 seconds thereby representing a flashover scenario.

On the other hand, the living room tests shown in FIG. 2 show the following characteristics:

1. The room ceiling temperature was recorded at 202° C. at ceiling height when the shoulder height temperature was at 163° C.
2. In about 21 seconds, the shoulder height temperature increased to 211° C.
3. At this stage, the ceiling value clocked at 302° C. which, similar to dining room fire behaviour, increased to 502° C. in about 36 seconds thereby representing a flashover scenario.

Despite a difference in the time taken in both the cases for a ceiling temperature reading to rise above 500° C., it is possible to predict a flashover condition if the ceiling temperature's rate of change is monitored in conjunction with the shoulder temperature behaviour.

FIG. 3 shows an example of a firefighter protection apparatus 2 for giving advance warning of a temperature rise condition for a firefighter. The apparatus 2 comprises processing circuitry 4 for performing data processing, a number of temperature sensors including in this example an infrared temperature sensor 6 which is an example of a remote temperature sensor for sensing temperature at a location remote from the apparatus 2 itself, and a thermocouple 8, which is an example of a proximity temperature sensor for detecting temperature in the vicinity of the apparatus 2. While FIG. 3 shows an example with two temperature sensors, other examples may have only one of the temperature sensors 6, 8 or could have three or more sensors including one or both of the types shown. Optionally, the apparatus 2 may include at least one further sensor 10, such as a gas sensor, humidity sensor or pressure sensor. The processing circuitry 4 executes program code 12 stored in data storage circuitry 14 (e.g. a memory such as Flash memory or DRAM). The program code 12 may define the algorithms for processing the sensor data and determining whether to issue a warning to the firefighter. The program code 12 may implement a machine learning model which may calculate an estimated risk of a temperature rise occurring based on the sensor data from the sensors 6, 8, 10. The model is defined using trained model coefficients 16 or weights which have been determined during a training phase based on corresponding sensor data recorded in a real fire under observation. The model will be discussed in more detail below. The data storage 14 may also store raw sensor data 18 from the sensors 6, 8, 10, and/or may store predicted temperature data 20 predicted for future times by the trained model. The apparatus 2 also has an orientation sensor 22 for sensing an orientation option of the apparatus 2 relative to some reference point. For example the orientation sensor 22 may comprise one or more inertial sensors such as an accelerometer, gyroscope or magnetometer.

The apparatus 2 also has communication circuitry 24, 26 for communicating with other devices, including long range communication circuitry 24, such as a radio transmitter for communicating via cellular networks, for communicating with a remote server or other device used by an operation commander to control or oversee a number of firefighters dealing with the fire. The long range communication could be via a mesh network. Also, short range communication circuitry 26 may be provided for communicating locally with other devices held by the firefighter, such as a camera (not shown in FIG. 3) or a wearable device 30 which can be worn by a firefighter. For example the short communication 26 may be via Bluetooth, Wifi, Zigbee or any other kind of protocol for communicating over relatively short distances.

While FIG. 3 shows an example where wired connections are used between the processing circuitry 4 and the sensors 6, 8, 10, 22, in other examples at least one of the sensors 6, 8, 10, 22 may communicate its sensor data to the processing circuitry 4 via wireless communication. Hence, in this case the short range communication circuitry 26 may also be used to receive the sensor data from wirelessly connected sensors.

The wearable device 30 may for example be a watch, bracelet or wristband, piece of clothing, helmet or facemask or heads up display worn by the firefighter, and can be used to provide feedback to the firefighter. When the machine learning model running on the processing circuitry 4 predicts that there is a risk of the temperature rise event occurring, a signal is transmitted to the wearable device 30 by the short range communication circuitry 26, which triggers the wearable device 30 to output a warning. For example, the wearable device may include a display 32 for displaying text or images to the firefighter, an LED 34 other warning light for lighting up or flashing on and off to provide a warning, a speaker 36 for providing an audible warning, or a vibrating element 38 (e.g. a buzzer or piezoelectric element) for providing a tactile alarm to the firefighter which can be felt by the firefighter. The device 30 also includes communication circuitry 40 for communicating with the short range communication circuitry 26 in the firefighter protection apparatus 2, and processing circuitry 42 for processing signals received by the communication circuitry 40 and controlling the operation of the output devices 32 to 38 accordingly. It will be appreciated that a particular implementation of the wearable device 30 need not have all of these elements 32, 34, 36, 38. For example, a bracelet could be provided with an LED 34 and a vibrating element 38, but might not have the speaker, while a headset could be provided with a heads up display 32 and speaker 36, but no LED or vibrating element. Hence, the particular form of the alarm provided to the wearer may depend on the type of wearable device. Also, some implementations may use a combination of two or more types of wearable device (e.g. both a headset and a wrist watch).

One particularly useful example may be to provide a bracelet to be worn inside the firefighter's protective clothing, providing a warning using a vibrating element 38 which can be felt by the firefighter, as well as a smart watch or other wrist-worn device to be worn outside the protective clothing, comprising a display 32 for displaying the warning indication and optionally other information to the firefighter. Providing the inner bracelet increases the likelihood that the warning is perceived quickly by the firefighter, as it does not require the firefighter to be looking at the smart watch, but providing the additional watch allows further information to be provided, such as an indication of the temperature monitored, estimated time to flashover, degree of risk detected, etc.

While FIG. 3 shows an example with a separate wearable device 30 for providing warnings to the firefighter, in other examples some or all of the functionality of the wearable device 30 could be integrated with the firefighter protection apparatus 2. For example, the apparatus 2 itself may have a speaker for outputting an audible warning, FIG. 4 shows one example implementation of the firefighter protection apparatus 2. The firefighter protection apparatus 2 may comprise a module (e.g. a small box or enclosure) which can be fitted onto breathing apparatus 50 to be worn by the firefighter. The breathing apparatus may include a gas canister 52 for containing oxygen or air to be breathed by the firefighter, a valve or other control device 54 for controlling the provision of air or oxygen from the canister 52 to the firefighter, a tube 56 providing the air to a facemask 58 that can be worn by the firefighter, and a harness 60 for attaching the breathing apparatus 50 to the back of the firefighter. As shown in FIG. 4, it can be useful to mount the firefighter protection apparatus 2 as high as possible on the breathing apparatus 50 to reduce the extent to which the communications from the circuits 24, 26 are blocked by the body of the firefighter. Nevertheless, the firefighter protection apparatus 2 could be mounted lower if desired. In some cases the firefighter protection apparatus 2 could be provided separately and fitted afterwards to existing breathing apparatuses. Alternatively, the firefighter protection apparatus 2 could be entirely integrated with the breathing apparatus 50 as a single product.

In one particular embodiment, the processing circuitry 4 may comprise a chipset, running on an embedded 'system on module' (SOM), in essence, a compact stand-alone computer. The SOM is mounted on a printed circuit card, inside a rugged enclosure 2 which will also take various sensor inputs to collect and process data on the SOM. The core hardware on the breathing apparatus set also provides connectivity over wireless and cellular networks, allowing information to be transmitted from the breathing apparatus set module 2, including a GPS derived location for example. The shorter range wireless network communications are used to communicate with separate devices near to the breathing apparatus set module 2, e.g. a helmet mounted camera to provide video data, or a paired Bluetooth device e.g. a smart watch, to provide local feedback of information to the individual firefighter. The longer range cellular communications can be over both public and private cellular networks, to provide back-haul to a cloud-based server. This server could be accessed by an incident commander on a separate device, e.g. tablet computer, in order to view the information being generated from each of his/her firefighters. The software may use a commercial off-the-shelf operating system (e.g. Android®) running applications implementing the machine learning model, which may be written in a programming language such as Java. The SOM takes input data from compact, non-contact, infrared sensors, which also have a local thermocouple in the sensor head. The sensors may for example be commercial off-the-shelf CT-SF22-03 sensors provided by micro-epsilon. The non-contact infrared sensors comprise a thermopile coupled to a set of optics to provide a focus on a heated object. The sensors are mounted vertically to measure temperatures above the firefighter (i.e. the ceiling in most building environments), alongside the thermocouple measurement which is at shoulder height. The temperature data is fed into an artificial neural network, which has been trained from a comprehensive time series data set from the National Institute of Standards and Technology (NIST), based upon a house fire experiment. This experiment measured the development of temperatures and heat fluxes at different heights, inside different rooms, as the flashover condition develops. The artificial neural network described previously has been trained to sample data and predict the rate of temperature rise, and has been successful in predicting a flashover condition 27 seconds before occurrence. The local temperature and warning can be communicated to the firefighter via a paired device e.g. smart watch; temperature being given as a direct numerical value, while the warning indication can be colour-coded (e.g. green through to red) based upon a number of different classes, relating to the progression of the flashover condition. This data can also be shared by the longer range communications back to the cloud server so as to provide instant commander with this information.

FIG. 5 shows an example of how the device carried by the firefighter within a burning room can be used to monitor the temperatures at multiple vertical heights within the room. The thermocouple 8 within the firefighter protection apparatus 2 may measure a temperature $T_{th}$ at the height of the apparatus 2 itself (e.g. shoulder height) and the infrared temperature sensor 6 may point upwards and measure temperature $T_{IR}$ based on infrared radiation detected within a certain field of view 70. For example the field of view 70 may cover a relatively small area such as a spot size of diameter of a few millimetres or centimetres. Hence, the orientation of the infrared sensor 6 may be significant as if the firefighter tilts to a significant degree, such as when crawling or ducking to avoid obstacles, then the infrared sensor may no longer be pointing upwards towards the ceiling and may instead be measuring temperature at a position lower down such as on the wall. To prevent such inaccurate readings affecting the prediction of the model, the orientation sensor 22 can be used to exclude sensor readings from the infrared temperature sensor 6 which are captured when the orientation is not always in certain bounds corresponding to an upwards direction of the sensor. The exact angles determined for such bounds will depend on the implementation used, e.g. on the reference point used by the orientation sensor and the relative angular orientations at which the orientation sensor 22 and the infrared temperature sensor 6 are mounted on the firefighter protection apparatus 2.

It will be appreciated that FIG. 5 shows one example arrangement of possible sensors which could be used, but other arrangements could also be used. In another example, one thermocouple may be mounted on the firefighter's helmet and a second thermocouple may be mounted lower down, e.g. at shoulder or waist height. The combination of multiple thermocouples mounted at different heights on the firefighter's body has been tested and found to provide sufficient predictive ability for the machine learning model. Hence, it is not essential for a remote (infrared) sensor to be provided or for the ceiling height temperature data to be recorded.

As shown in FIG. 6, the training model may be used to repeatedly predict future temperatures for a sliding future window of time based on a corresponding sliding past windows of temperature sensor data captured by the infrared sensor 6 and the thermocouple 8 respectively. In this example, the predicted temperature values are values predicted to be sensed by the infrared sensor 6 at ceiling height, as this can give more advanced warning of the temperature rise event, but it would also be possible to use the model to predict the temperatures to be sensed by the thermocouple 8 instead, or to predict temperatures at multiple heights using the model. Generally as the temperature of a fire is increasing, the infrared sensor 6 will detect a higher temperature than the thermocouple 8 due to the hotter gases accumulating at ceiling level. At a given moment $t_0$ in time, the input data for the training model comprises the past N measurements from each of the two sensors 6, 8, in this example N=5 and so the input data comprises values $T_{th-4}$ to $T_{th0}$ captured by the thermocouple 8 at times $t_{-4}$ to $t_0$ respectively (where $t_0$ is the time of the most recent capture) and values $T_{IR-4}$ to $T_{IR0}$ captured at times $t_{-4}$ to $t_0$. The model processes these inputs to calculate P predicted values for a future window of time, in this example P=10 and so the predicted values comprise temperatures $T_1$ to $T_{10}$ corresponding to future times $t_1$ to $t_{10}$ respectively.

Based on the predicted window of future temperature values, the processing circuitry 4 can determine whether any of these values meet a given condition for triggering a warning indication. For example, the processing circuitry 4 may determine whether any of the predicted temperature values exceed a given threshold (e.g. 500° C. for detecting a flashover event), or whether a rate of change of the predicted temperature values exceeds a given threshold. If the trigger condition is satisfied, a warning signal is sent to the wearable device 30, by the processing circuitry 4 controlling the short range communication circuitry 26 to signal a suitable control value to the wearable device 30.

As time progresses, the sliding past and future windows move on in time as more temperature data is received. For example, following the calculation shown in FIG. 6, further temperature sensor data is received for time $t_1$, so the next sliding past window of time will correspond to the temperature values captured in times $t_{-4}$ to $t_0$, and the next future window of time for which the predictions are made will correspond to times $t_1$ to $t_{11}$. Hence, the calculation is repeated multiple times for each successive window of sensor data to provide ongoing predictions of risk of temperature rise events.

FIG. 7 shows an example of an artificial neural network which can be used as the machine learning model. It will be appreciated that the diagram in FIG. 7 is merely a schematic representation of the processing performed by the artificial neural network. In practice, the network may be implemented in software which performs a series of calculations to calculate values for each node of the network.

The neural network comprises an input layer 100 comprising a number of nodes 102. Each of the temperature values $T_{th-4}$ to $T_{th0}$ and $T_{IR-4}$ to $T_{IR0}$ captured by the respective sensors 8, 6 during the sliding past window of time is input to a corresponding one of the nodes 102 of the input layer 100. If a further (non-temperature) sensor 10 is provided in the apparatus 2 then further nodes may be provided for receiving the sensor data from the further sensor 10. The input layer 100 may also have one or more additional nodes 103 which receive a constant value b which is independent of the captured sensor data (the constant value b may be one of the parameters which is learnt during the training phase).

The network also comprises at least one hidden layer 104 of nodes 106. In each hidden layer 104, each node 106 receives the values represented by each node 102 of the preceding layer. In this particular example, there is only one hidden layer 104, so each node 106 receives the values input at each node 102 of the input layer 100, but if multiple hidden layers 104 were provided then the first hidden layer would receive values from the nodes of the input layer 100, and subsequent hidden layers 104 would receive the values output by nodes 106 of a preceding hidden layer. Each node 106 of the hidden layer 104 outputs a value f(x0, x1, ..., xN, w0, w1, ..., wN) obtained as a function of all the inputs to that node and a corresponding set of weights w learnt during the training phase. Separate sets of weights may be defined for each node of the hidden layer 104 and for a given node 106 of the hidden layer, separate weights may be defined for each input x. The weights to be used may be defined by the stored model coefficients 16 in the data storage 14. The stored model coefficients 16 may also specify other parameters defining the particular function to be used.

For example, the output of a given node 106 of the hidden layer 104 could be determined according to the following equation:

$$f(x_0 \ldots x_N, w_0 \ldots w_N) = \sigma(t) \quad (1)$$

where t is the weighted sum of the inputs to the node:

$$t = \sum_{i=0 \ldots N} x_i w_i \quad (2)$$

and σ(t) is a sigmoid function used as an activation function for controlling the relative extent to which each node 106 of the hidden layer 104 affects the final prediction:

$$\sigma(t) = \frac{1}{1 + e^{-\beta t}} \quad (3)$$

β is a slope parameter defined in the model coefficients 16. The slope parameter β could be the same for all nodes or could be different and learnt for each node as part of the training phase. It will be appreciated that other activation functions could be used to control the extent to which the weighted sum of inputs affects the output, but the sigmoid function can be particularly useful because its derivative is easy to calculate which makes some training algorithms for updating the weights w easier to implement. It will be appreciated that equations 1 to 3 above are just one example of a possible function for determining the output of each node.

The final layer of the artificial network is an output layer 108 comprising a number of nodes 110 whose outputs represent the predicted temperature values $T_1$ to $T_{10}$. As for the hidden layer 104, each output node 110 receives the values calculated for each node 106 of the preceding layer 106, and calculates its output as a function of its inputs x and weights w, for example according to equations 1 to 3 shown above.

To train the network, temperature sensor data measured during a fire in a real environment (such as the NIST data mentioned above) is partitioned into windows of time. An initial set of weights w and other model parameters (such as the constant b or slope parameter β mentioned above) is selected, and each window of training data is input to the network and processed using the current model parameters to predict future temperatures is assumed way to shown in FIG. 5 and the model initially assumes some default weights. The network then predicts values for a future window of time at the output layer 112 and these are compared with the actual temperature values which were observed during the real fire, and errors between the predicted and actual temperature values are calculated. Error values for each window of training data may be calculated, and an overall error score may be derived. An error minimisation function (e.g. using a back propagation and/or gradient descent algorithm) is then used to adjust the weights and model parameters to try to reduce the error for a subsequent iterations of the training phase. The updated model parameters are then used in another attempt to predict temperature values based on the training data, and the error is evaluated again. Gradually, the error may decrease as the model parameters improve, and eventually the training process halts when the error drops below a given threshold. It may take hundreds or thousands of iterations to arrive at the eventual model parameters to be used. A more detailed example of the training process is described in Appendix B below.

Appendix A below shows results of applying the trained artificial neural network to the NIST living room data to test the model's predictive ability. For conciseness, Appendix A does not show all the past temperature values used for the prediction, and each line of Appendix A simply shows the "current temperature" and the 10 predicted temperatures predicted for the next 30 seconds. In this example, the neural network was trained based on the NIST data for the sensor at 7.42 foot in the living room data set, and tested on the corresponding height data from the dining room data set. The refresh period of the temperature sensors is 3 seconds and so each line of Appendix A represents a prediction made 3 seconds after the previous prediction. As shown in Appendix A, the current temperature is initially around 15-16° C., representing the room temperature before the fire is lit. Around lines 34-39 of Appendix A the temperature starts to increase due to the fire.

Line 56 of Appendix A is the first time that one of the predicted temperatures exceeds 500° C., signalling that a flashover event is predicted. At this point, the warning may be triggered to the firefighter. The actual temperature at shoulder height reaches 500° C. at line 70 of Appendix A. Hence, it took 14 time-steps between the model predicting flashover, and the real flashover event being encountered. As the refresh rate in this example is 3 seconds, this means that the model provided 42 seconds' warning of the imminent flashover. At the time that the warning was provided (line 56), the current temperature at shoulder height was still 269° C., which could still be safely withstood by the firefighter's protective clothing. Hence, this shows how the trained model can successively provide sufficient warning of an imminent flashover event.

FIGS. 8 to 15 show graphs indicating the results of further tests of a trained artificial neural network on the NIST temperature data. In each case, the neural network was trained based on the temperatures recorded by one of the eight sensors of the NIST living room data set, and then tested by applying the trained model to the temperature data recorded at the corresponding height in the NIST dining room data set, as follows:

| FIG. | Thermocouple | Height from Floor (m) | Height from Floor (ft) |
| --- | --- | --- | --- |
| 8 | TC0 | 2.26 | 7.42 |
| 9 | TC1 | 1.98 | 6.5 |
| 10 | TC2 | 1.68 | 5.5 |
| 11 | TC3 | 1.37 | 4.5 |
| 12 | TC4 | 1.07 | 3.5 |
| 13 | TC5 | 0.76 | 2.5 |
| 14 | TC6 | 0.46 | 1.5 |
| 15 | TC7 | 0.15 | 0.5 |

In each graph, line A represents the actual temperatures recorded by the corresponding thermocouple in the NIST dining room data set, and line B represents the temperatures predicted by the trained artificial neural network. When standing upright, a fire-fighter's standard height is presumed less than or equal to 6.5 ft, so sensors TC1-TC7 may all represent heights where temperature increases may pose a risk to the firefighter. However, fire-fighters do not always stand upright hence in a prone position the height is approximated at 0.76 m/2.5 ft, so the data from sensor TC5 may be of interest for this. For the particular dataset used, the actual flashover (based on the top-most TC0 temperature sensor) started at 3 minute-30 second time. However, similar temperature flashover condition for the sensor mounted at a standard fire-fighter height (1.98 m/6.5 ft) was reached in the next 3 seconds, and as the neutral-plane moved further below, for a prone-height (0.76 m/2.5 ft), similar flashover conditions were reported by the TC6 sensor in the next 1 minute-18-seconds. Based on FIGS. 8 to 15, the following observations can be made.

Figure 8:
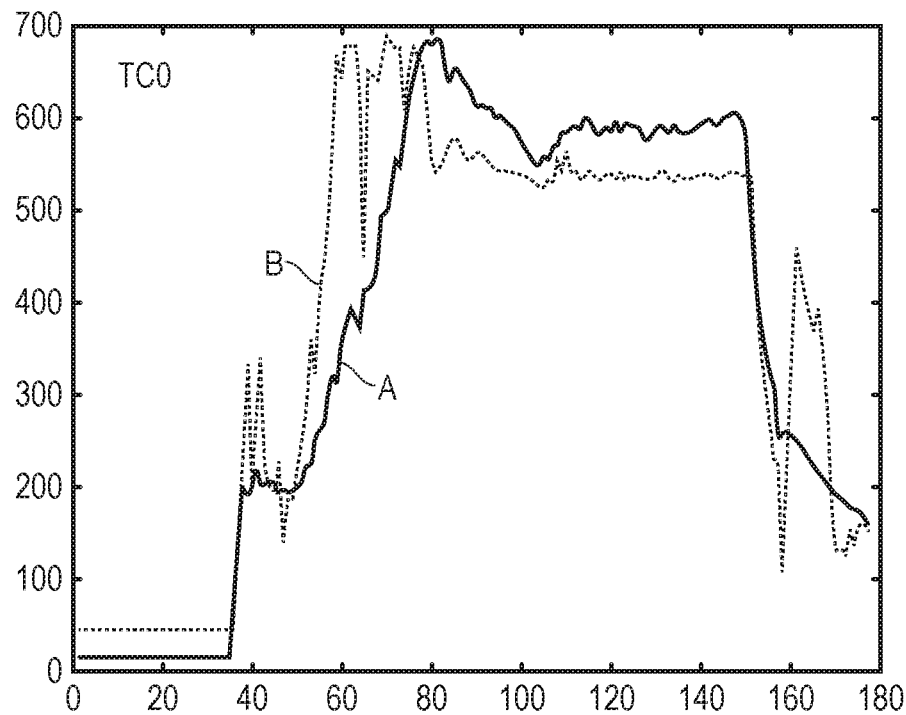

As shown in FIG. 8, for sensor TC0 at 2.26 m (7.42 ft), representing a typical ceiling height, the model predicted flashover predicted at 58th instance (2 minutes 54 seconds) when the current (actual) temperature was 322 Celsius. This temperature had increased within the past 63 seconds from 137 degrees to 322 degrees. The actual flashover happened at 70th reading when the temperature increased to 502 degrees Celsius, i.e. 36 seconds after the flashover predicted by the algorithm.

Figure 9:
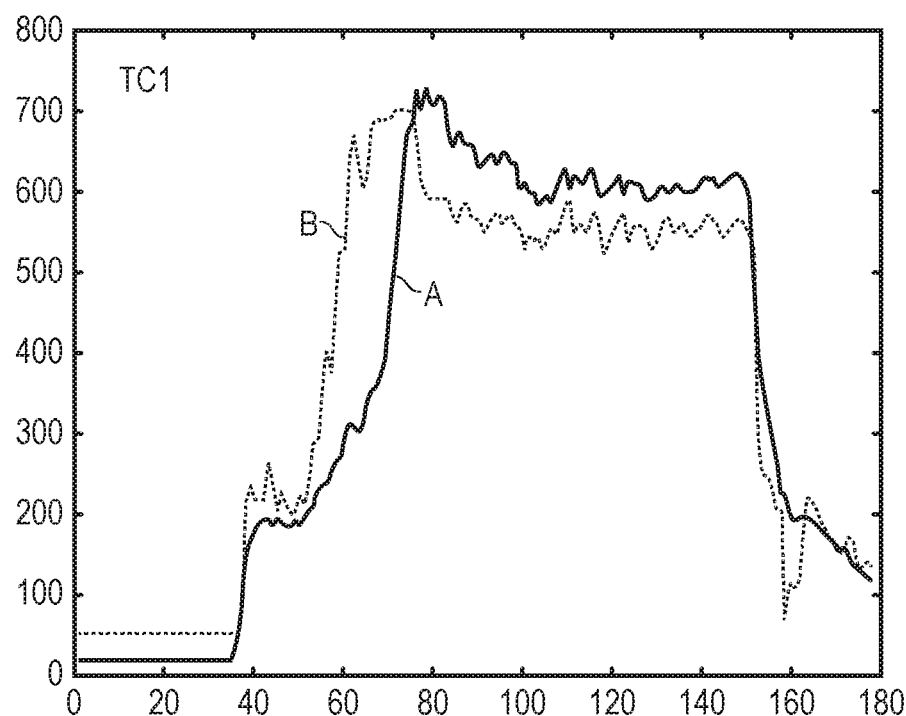

As shown in FIG. 9, for sensor TC1 at 1.98 m (6.5 ft), which may correspond to head height for a firefighter, flashover was predicted at 59th instance (2 minutes 57 seconds) when the current temperature was 265 Celsius. This temperature had increased within the past 66 seconds from 100 degrees to 265 degrees. The actual flashover happened at the 71st reading when the temperature increased to 504 degrees Celsius which happened 36 seconds after the flashover predicted by the algorithm.

Figure 10:
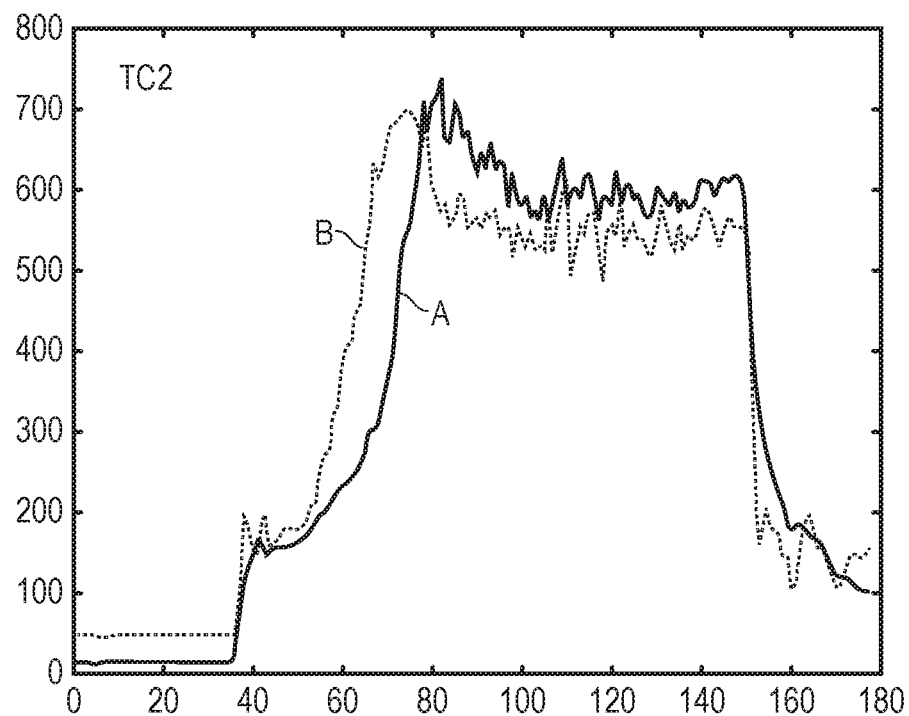

As shown in FIG. 10, for sensor TC2 at 1.68 m (5.5 ft), flashover was predicted at the 65th instance (3 minutes 15 seconds) when the current temperature was 306 Celsius. This temperature had recently increased within the past 72 seconds from 110 degrees to 306 degrees. The actual flashover happened at the 73rd reading when the temperature increased to 516 degrees Celsius which happened 24 seconds after the flashover predicted by the algorithm.

Figure 11:
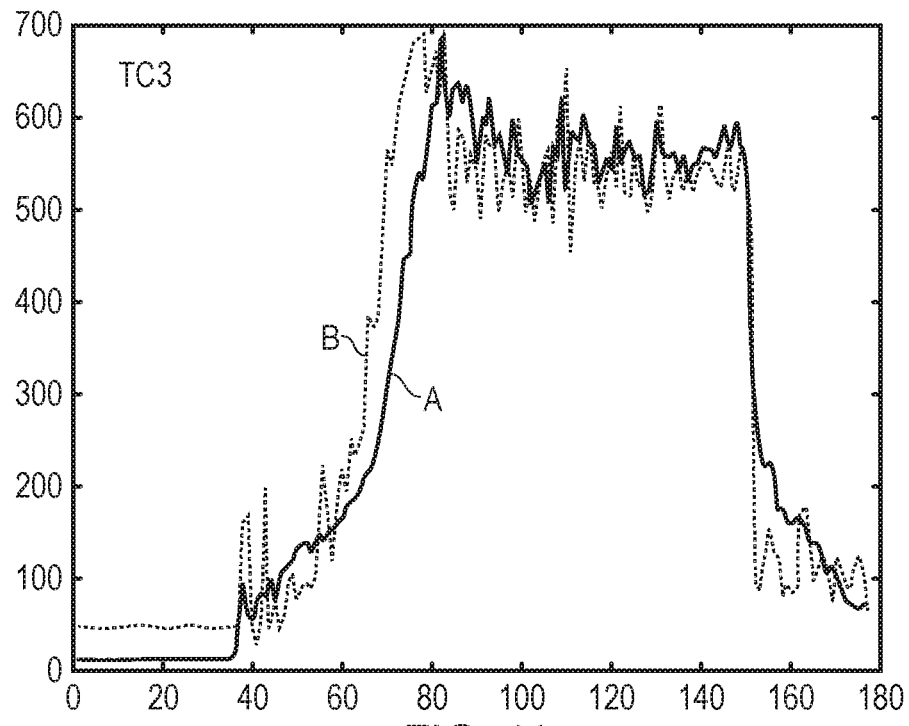

As shown in FIG. 11, for sensor TC3 at 1.37 m (4.5 ft), flashover was predicted at the 70th instance (3 minutes 30 seconds) when the current temperature was 306 Celsius. This temperature had recently increased within the past 72 seconds from 110 degrees to 306 degrees. The actual flashover happened at the 76th reading when the temperature increased to 513 degrees Celsius which happened 18 seconds after the flashover predicted by the algorithm.

Figure 12:
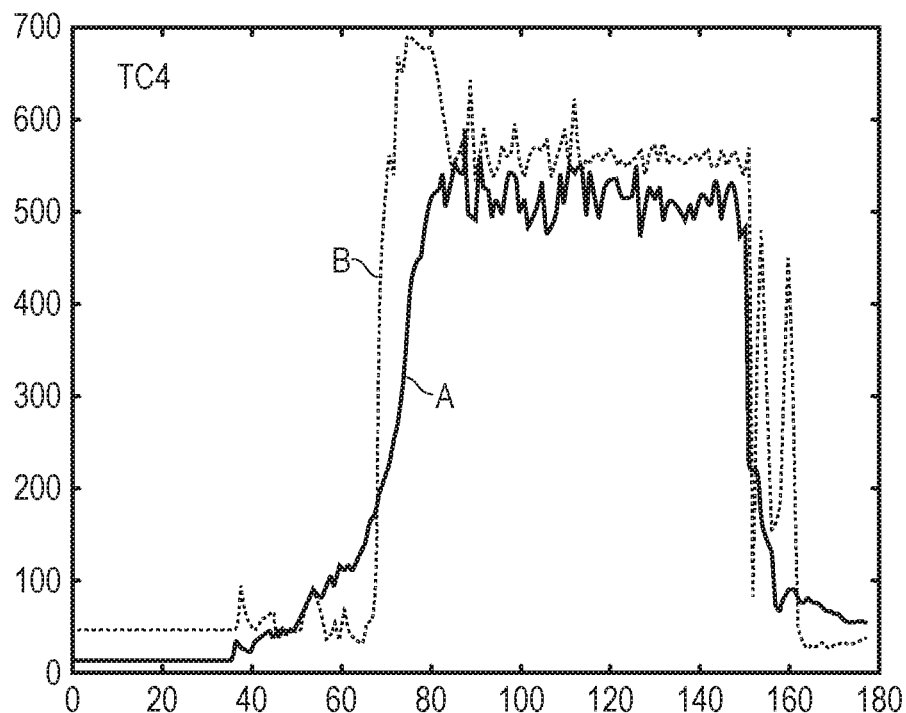

As shown in FIG. 12, for sensor TC4 at 1.07 m (3.5 ft), flashover was predicted at the 70th instance (3 minutes 30 seconds) when the current temperature was 214 Celsius. This temperature had recently increased within the past 33 seconds from 92 degrees to 214 degrees. The actual flashover happened 80th reading when the temperature increased to 512 degrees Celsius which happened 30 seconds after the flashover reporting by the algorithm.

Figure 13:
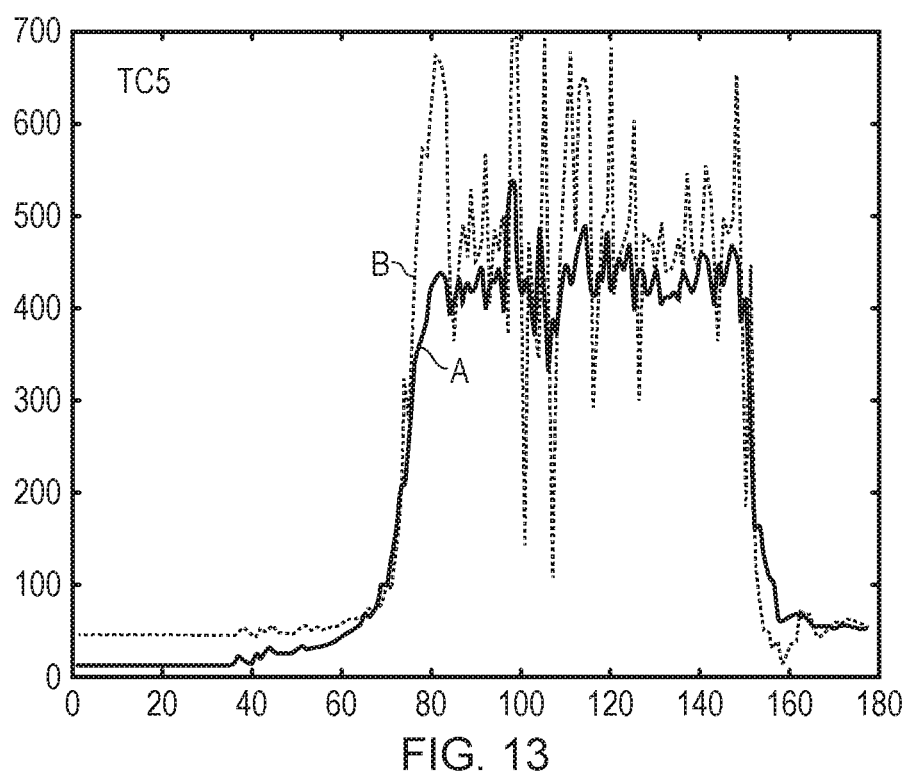

As shown in FIG. 13, for sensor TC5 at 0.76 m (2.5 ft), which is considered a typical prone human height which may be a typical posture for a firefighter during a rescue mission, especially in restricted places, flashover was predicted at the 77th instance (3 minutes 35 seconds) when the current temperature was 357 Celsius. This temperature had recently increased within the past 21 seconds from 100 degrees to 357 degrees. The actual flashover happened 97th reading when the temperature increased to 520 degrees Celsius which happened 60 seconds after the flashover reporting by the algorithm.

Figure 14:
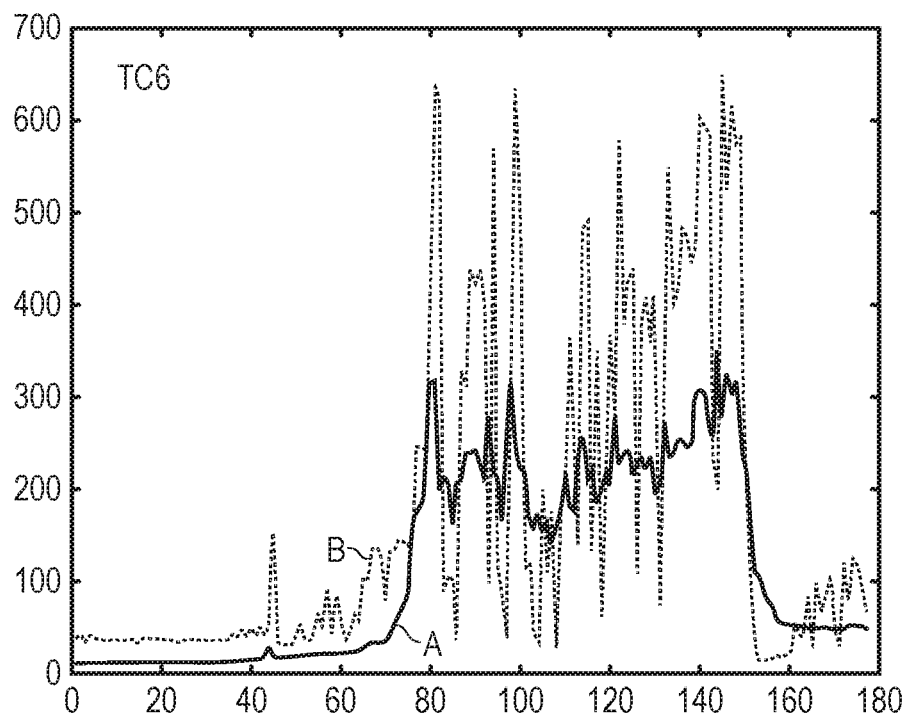

As shown in FIG. 14, for sensor TC6 at 0.46 m (1.5 ft), flashover was predicted at 133rd instance (5 minute 21 seconds) when the current temperature was already at 219.0 Celsius. However, the actual flashover never happened as the maximum temperature of 350 degrees Celsius reached in 7 minutes and 12 seconds showed erratic behaviour (See line A), presumably due to a very low sensor height.

Figure 15:
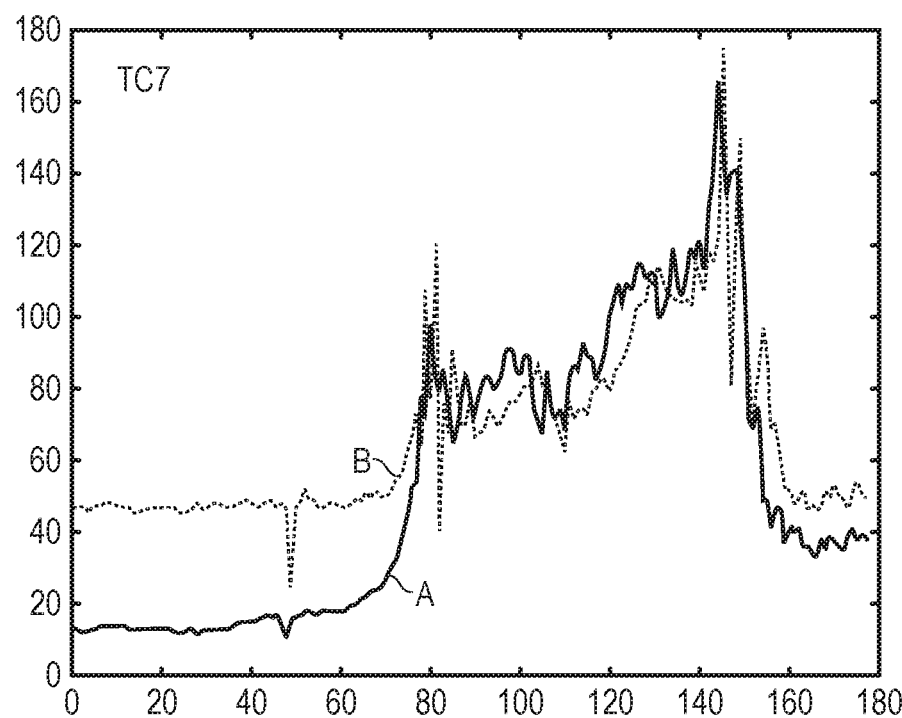

As shown in FIG. 15, for sensor TC7 at 0.15 m (0.5 ft), the overall temperature profile was low and no flashover occurred. Accordingly, the model did not predict a flashover event.

The results of these tests are summarised in the table below:

| Sensor height (m/ft) | Time temperature increased above 100-degrees before RoT $T_f$ prediction | Time at which the RoT algorithm predicted the flashover temperature $T_f$ | Original temperature at the prediction of $T_f$ (° C.) | Time taken for the actual flashover to be reached after prediction (seconds) |
|---|---|---|---|---|
| 2.26/7.42 | 1 minute 3 seconds | 2 minutes 54 seconds | 322 | 36 |
| 1.98/6.5 | 1 minute 3 seconds | 2 minutes 57 seconds | 265 | 36 |
| 1.68/5.5 | 1 minute 21 seconds | 3 minutes 15 seconds | 274 | 24 |
| 1.37/4.5 | 72 seconds | 3 minutes 30 seconds | 306 | 18 |
| 1.07/3.5 | 33 seconds | 3 minutes 30 seconds | 214 | 30 |
| 0.76/2.5 | 21 seconds | 3 minutes 35 seconds | 357 | 60 |
| 0.46/1.5 (false positive case) | 2 minutes 54 seconds | 6 minutes 39 seconds | 235 | Flashover not reached Max $T_f$ = 350 reached in 33 seconds |
| 0.15/0.5 | 1 minute 30 seconds | Flashover not reached | Flashover not predicted | Flashover not reached |

Hence, the actual flashover prediction ranged from 18 to 60 seconds with the longest predicted case recorded at the height of 0.76 m/2.5 ft. However, this height reported the fastest RoT from normal conditions of approximately 100-degree-celsius to prediction within 21 seconds. On 1.98 m/6.5 ft height, the flashover condition as predicted in 36 seconds with the temperature reaching the algorithmic prediction stage (3rd column) of 265 degrees Celsius in 1 minute 3 second duration. The duration shown in Column 2 can be considered as a "warning segment" which, on the average took approximately 1 minute 7 seconds for all 7 sensor predictions. For the lowest-height temperature sensor, the flashover was never predicted. However, in this case, the maximum temperature never went beyond 166 degrees Celsius. The second-last row showing the sensor mounted at 0.46 m/1.5 ft does however show a false positive as it predicted flashover closer to the 7th minute mark. However, the temperature only reached 350 degrees Celsius in the next 33 seconds before reducing again. Based on data from all the sensors, it can be understood that the majority of sensors predicted an impending flashover with a high accuracy. The earlier prediction however still came from the highest sensor. Nonetheless, the second and third highest sensors were still able to warn in ample time (in both cases the prediction was made before the 3 minutes 30 seconds time at which flashover occurs at ceiling height). This shows that while using ceiling height temperature measurements can provide greatest warning time, it is also possible to perform the prediction only using sensors mounted lower down on the body of the fire-fighter.

FIG. 16 is a flow diagram showing a method of predicting occurrence of a temperature rise event. At step 150 temperature data captured by at least one temperature sensor within an environment of the fire is received. At step 152 the temperature data from a previous windows of time is processed using a machine learning model to determine a risk indication indicating a risk of a temperature rise condition occurring in a future window of time. The risk indication could be the predicted temperature values as in FIGS. 6 and 7, or alternatively could be a qualitative indication of risk such as a class or type of risk condition (such as red, amber or green or some other indication of the level of risk). At step 154 a warning indication is output in dependence on the risk indication determined at step 152. For example, the warning indication could be generated if the risk indication meets certain criteria such as the temperature data being higher than a given threshold or the risk class being one of given number of types, FIG. 17 shows the method in more detail. At step 200 the processor receives sensor data for a previous sliding window of time. For example the temperature values from the sensors could be loaded into an array, and after each iteration of the prediction model the temperature values may shift up one position in the array when new sensor data is added, or alternatively the sliding window of sensor data could be managed in hardware using a shift register or FIFO buffer.

At step 202 the processing circuitry 4 determines, based on the orientation sensor 22, whether the orientation of the device is outside certain bounds. If so, at step 204 sensor data from the infrared sensor 60 is excluded from subsequent calculation or replaced with estimated sensor data such as sensor data obtained based on the interpolation of previously detected values when the orientation was within bounds, or previously predicted sensor data 20 determined using the model for the corresponding moments in time. On the other hand, if the orientation was within the permitted bounds then step 204 is omitted.

At step 206 the sensor data (with some of the data excluded or replaced as necessary in step 204) is input to the trained machine learning model which processes the data to evaluate each node of the network based on the coefficients or weights 16 learnt during training. The model outputs the predicted risk class or predicted temperature values for the future window of time. At step 208 the processing circuitry 4 determines whether the predicted risk class or temperature values meet certain warning criteria and if so then at step 210 a warning is output (either directly by the firefighter protection apparatus 2 itself, or via the short range communication 26 to an associated wearable device 30). A warning can also be sent via long range communication circuitry 24 to a remote device such as the operation commander's server or tablet. If the risk indication does not meet the warning criteria at step 208, then step 210 is omitted and no warning is output. At step 212 the temperature sensor data is updated with the next reading(s), to proceed to the next sliding window of time, and at step 202 the processing continues for the next window. Hence, the method is repeated again and again for successive windows of sensor data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX A

1. Current temperature 15.0 Next 30 s Prediction 22.959 24.782 26.655 28.65 31.248 34.708 37.065 39.967 44.485 47.732
2. Current temperature 15.0 Next 30 s Prediction 22.82 24.669 26.562 28.614 31.204 34.677 37.053 40.038 44.551 47.926
3. Current temperature 16.0 Next 30 s Prediction 23.111 25.022 26.959 29.032 31.585 35.023 37.447 40.355 44.871 48.167
4. Current temperature 16.0 Next 30 s Prediction 23.314 25.27 27.287 29.401 31.994 35.474 37.92 40.959 45.444 48.848
5. Current temperature 16.0 Next 30 s Prediction 23.184 25.124 27.075 29.199 31.777 35.289 37.729 40.756 45.281 48.685
6. Current temperature 16.0 Next 30 s Prediction 23.032 24.883 26.77 28.815 31.439 34.971 37.345 40.364 44.892 48.245
7. Current temperature 16.0 Next 30 s Prediction 23.039 24.875 26.749 28.792 31.422 34.949 37.32 40.34 44.882 48.268
8. Current temperature 15.0 Next 30 s Prediction 23.338 25.222 27.124 29.186 31.787 35.275 37.692 40.633 45.195 48.534
9. Current temperature 16.0 Next 30 s Prediction 22.839 24.631 26.426 28.43 31.02 34.505 36.855 39.744 44.316 47.595

10. Current temperature 16.0 Next 30 s Prediction 23.469 25.363 27.333 29.386 32.004 35.46 37.882 40.835 45.357 48.697
11. Current temperature 16.0 Next 30 s Prediction 23.492 25.466 27.433 29.574 32.129 35.596 38.079 41.026 45.587 48.977
12. Current temperature 16.0 Next 30 s Prediction 23.331 25.23 27.147 29.21 31.304 35.297 37.716 40.653 45.204 48.511
13. Current temperature 15.0 Next 30 s Prediction 23.039 24.875 26.749 28.792 31.422 34.949 37.32 40.34 44.382 48.268
14. Current temperature 15.0 Next 30 s Prediction 22.839 24.631 26.426 28.43 31.02 34.505 36.855 39.744 44.316 47.595
15. Current temperature 16.0 Next 30 s Prediction 22.966 24.774 26.633 28.626 311.22 34.686 37.041 39.942 44.476 47.755
16. Current temperature 16.0 Next 30 s Prediction 23.623 25.613 27.647 29.778 32.348 35.782 38.272 41.23 45.75 49.14
17. Current temperature 16.0 Next 30 s Prediction 23.435 25.474 27.456 29.599 32.147 35.613 38.104 41.052 45.597 48.953
18. Current temperature 16.0 Next 30 s Prediction 23.032 24.883 26.77 23.815 31.439 34.971 37.345 40.364 44.892 48.245
19. Current temperature 15.0 Next 30 s Prediction 23.039 24.875 26.749 28.792 31.422 34.949 37.32 40.34 44.882 43.268
20. Current temperature 15.0 Next 30 s Prediction 22.839 24.631 26.426 28.43 31.02 34.505 36.855 39.744 44.316 47.595
21. Current temperature 16.0 Next 30 s Prediction 22.966 24.774 26.633 28.626 31.232 34.686 37.041 39.942 44.476 47.755
22. Current temperature 15.0 Next 30 s Prediction 23.623 25.613 27.647 29.773 32.348 35.782 38.272 41.23 45.75 49.14
23. Current temperature 16.0 Next 30 s Prediction 22.982 24.873 26.75 23.833 31.371 34.841 37.259 40.155 44.71 48.006
24. Current temperature 16.0 Next 30 s Prediction 23.161 25.023 26.98 29.014 31.654 35.154 37.534 40.565 45.053 48.406
25. Current temperature 16.0 Next 30 s Prediction 23.191 25.116 27.053 29.175 31.76 35.267 37.704 40.731 45.272 48.709
26. Current temperature 16.0 Next 30 s Prediction 23.331 25.23 27.147 29.21 31.804 35.297 37.716 40.658 45.204 48.511
27. Current temperature 16.0 Next 30 s Prediction 23.039 24.875 26.749 28.792 31.422 34.949 37.32 40.34 44.882 48.268
28. Current temperature 16.0 Next 30 s Prediction 23.338 25.222 27.124 29.186 31.787 35.275 37.692 40.633 45.1195 48.534
29. Current temperature 16.0 Next 30 s Prediction 23.338 25.222 27.124 29.186 31.787 35.275 37.692 40.633 45.1195 48.534
30. Current temperature 16.0 Next 30 s Prediction 23.338 25.222 27.124 29.186 31.787 35.275 37.692 40.633 45.1195 48.534
31. Current temperature 16.0 Next 30 s Prediction 23.338 25.222 27.124 29.186 31.787 35.275 37.692 40.633 45.195 48.534
32. Current temperature 16.0 Next 30 s Prediction 23.338 25.222 27.124 29.186 31.787 35.275 37.692 40.633 45.195 48.534
33. Current temperature 16.0 Next 30 s Prediction 23.338 25.222 27.124 29.186 31.787 35.275 37.692 40.633 45.195 48.534
34. Current temperature 16.0 Next 30 s Prediction 23.338 25.222 27.124 29.186 31.787 35.275 37.692 40.633 45.195 48.534
35. Current temperature 16.0 Next 30 s Prediction 23.338 25.222 27.124 29.186 31.787 35.275 37.692 40.633 45.195 48.534
36. Current temperature 59.0 Next 30 s Prediction 23.338 25.222 27.124 29.186 31.787 35.275 37.692 40.633 45.195 48.534
37. Current temperature 137.0 Next 30 s Prediction 58.183 68.263 30.787 86.861 87.937 88.341 95.279 100.749 100.973 107.013
38. Current temperature 203.0 Next 30 s Prediction 204.208 258.524 306.759 326.58 305.949 281.811 298.235 299.757 272.353 274.773
39. Current temperature 191.0 Next 30 s Prediction 342.701 403.268 433.255 443.174 425.0 400.166 403.475 399.096 361.706 350.059
40. Current temperature 202.0 Next 30 s Prediction 200.525 212.391 202.482 202.128 213.172 225.038 218.351 229.716 227.442 230.98
41. Current temperature 220.0 Next 30 s Prediction 245.243 244.523 236.353 225.389 240.21 236.187 228.368 231.252 224.692 226.812
42. Current temperature 203.0 Next 30 s Prediction 271.754 278.017 280.24 284.532 291.965 291.831 299.086 308.467 312.439 331.959
43. Current temperature 204.0 Next 30 s Prediction 199.662 200.981 198.721 202.32 206.636 215.306 222.16 228.141 242.509 251.304
44. Current temperature 206.0 Next 30 s Prediction 202.311 199.03 198.585 193.637 205.298 209.652 213.9 221.405 226.982 237.365
45. Current temperature 204.0 Next 30 s Prediction 204.57 204.675 206.985 211.939 216.012 221.114 227.003 238.103 246.583 261.716
46. Current temperature 193.0 Next 30 s Prediction 195.11 196.401 201.931 206.352 209.624 215.886 221.062 232.887 243.948 254.392
47. Current temperature 198.0 Next 30 s Prediction 184.837 181.524 177.321 177.391 180.337 184.344 186.954 190.363 196.044 201.156
48. Current temperature 195.0 Next 30 s Prediction 192.57 191.211 194.722 196.716 200.418 203.844 207.437 216.928 222.461 232.474
49. Current temperature 196.0 Next 30 s Prediction 190.309 190.712 192.703 196.38 198.164 202.289 206.457 214.349 222.478 231.315
50. Current temperature 201.0 Next 30 s Prediction 191.412 191.658 195.611 198.017 201.188 205.48 209.627 218.294 226.119 234.28
51. Current temperature 206.0 Next 30 s Prediction 203.479 205.058 209.596 213.581 217.634 222.121 227.899 237.889 246.315 258.191
52. Current temperature 224.0 Next 30 s Prediction 208.889 212.225 219.067 224.337 228.838 234.752 241.779 253.808 264.734 277.936
53. Current temperature 223.0 Next 30 s Prediction 239.778 247.778 262.199 270.218 277.674 284.833 295.319 313.423 326.25 345.602

54. Current temperature 249.0 Next 30 s Prediction 233.598 2 9.967 245.937 255.024 263.194 274.892 287.374 303.126 322.669 344.542
55. Current temperature 263.0 Next 30 s Prediction 275.636 287.245 307.561 318.312 332.25 344.008 360.098 385.423 404.052 432.785
56. Current temperature 269.0 Next 30 s Prediction 296.412 314.259 332.389 353.2 371.118 393.423 419.01 449.476 482.376 521.146
57. Current temperature 302.0 Next 30 s Prediction 287.664 303.406 321.943 342.247 366.588 397.226 427.977 461.944 502.916 544.588
58. Current temperature 322.0 Next 30 s Prediction 352.605 378.319 408.654 434.869 464.424 493.753 527.041 560.947 593.789 628.158
59. Current temperature 313.0 Next 30 s Prediction 361.387 397.174 42.056 471.22 503.237 550.538 588.544 619.613 651.224 673.275
60. Current temperature 362.0 Next 30 s Prediction 336.483 360.633 377.118 411.604 453.596 507.05 553.177 586.47 629.179 659.525
61. Current temperature 377.0 Next 30 s Prediction 412.169 451.809 496.786 534.298 572.198 604.978 635.541 658.149 676.902 689.396
62. Current temperature 395.0 Next 30 s Prediction 402.173 448.207 489.296 537.749 577.174 617.385 647.18 667.272 684.82 693.577
63. Current temperature 385.0 Next 30 s Prediction 411.605 455.554 502.395 546.391 587.532 624.658 657.312 670.921 636.641 694.303
64. Current temperature 372.0 Next 30 s Prediction 437.604 461.216 463.65 494.923 530.254 570.803 606.21 625.674 652.93 674.043
65. Current temperature 415.0 Next 30 s Prediction 379.717 389.473 385.207 408.145 441.278 484.633 525.853 547.369 534.66 620.669
66. Current temperature 416.0 Next 30 s Prediction 384.996 425.375 487.537 537.348 573.02 613.487 643.247 666.983 683.731 69.111
67. Current temperature 421.0 Next 30 s Prediction 402.906 434.702 465.764 505.218 539.776 579.663 610.881 635.272 662.58 673.34
68. Current temperature 449.0 Next 30 s Prediction 415.117 443.474 476.723 512.244 549.439 585.866 616.733 640.105 664.572 630.045
69. Current temperature 498.0 Next 30 s Prediction 461.565 496.593 533.63 570.157 599.715 624.504 647.401 665.27 680.414 690.383
70. Current temperature 502.0 Next 30 s Prediction 481.631 528.178 580.843 614.378 637.776 655.339 669.982 632.559 691.723 696.148
71. Current temperature 523.0 Next 30 s Prediction 522.825 549.94 568.174 589.488 607.831 624.251 638.561 650.924 666.71 676.593
72. Current temperature 557.0 Next 30 s Prediction 550.817 573.776 592.587 609.151 623.977 633.059 644.834 655.693 667.522 677.185
73. Current temperature 550.0 Next 30 s Prediction 574.643 595.198 610.318 624.216 634.277 639.81 648.209 657.313 667.086 675.657
74. Current temperature 586.0 Next 30 s Prediction 565.424 572.714 569.758 573.242 577.102 579.391 580.723 577.876 580.707 576.753
75. Current temperature 626.0 Next 30 s Prediction 592.006 603.798 614.172 620.927 627.123 627.8 632.257 638.011 644.634 651.072
76. Current temperature 639.0 Next 30 s Prediction 623.19 633.489 637.228 640.837 643.0 643.278 644.385 646.437 651.648 655.034
77. Current temperature 666.0 Next 30 s Prediction 634.676 639.604 636.596 633.77 631.716 629.208 623.887 616.793 615.372 604.906
78. Current temperature 681.0 Next 30 s Prediction 654.541 658.358 655.383 652.375 648.998 642.419 635.448 626.53 618.646 606.937
79. Current temperature 686.0 Next 30 s Prediction 659.334 660.701 654.494 649.471 643.153 636.008 625.815 612.704 600.295 583.615
80. Current temperature 682.0 Next 30 s Prediction 659.552 658.739 651.921 645.057 637.264 630.222 618.758 605.446 593.9 577.824

APPENDIX B

An example of a training process for updating the weights of an artificial neural network based on training data is shown below. It will be appreciated this is just one example of a training process, and other techniques could be used.

The process of back propagation undergoes a weight optimisation process to allow the underlying neural network to learn to map arbitrary inputs to outputs. The training process is an iterative process, with each iteration including a forward pass propagation portion where the network using a given set of weights calculates predicted temperatures based on the input training data and compares this with the actual temperatures for the corresponding timings to determine errors, and a backward error propagation pass where the detected errors between the predicted temperatures and the actual temperatures are used to update the weights.

Forward Pass Propagation

FIG. 18 shows a simplified example of a neural network for understanding the training process. To evaluate this network's error calculation, weight adjustment and training, two initial values 15 and 16 degrees Celsius from the training data set are considered in the sliding window. The object would be to learn the next two future values of the sliding window which are 24 and 25 degrees Celsius in this example. It will be appreciated that this example is greatly simplified for ease of understanding, and in practice the network may have more neurons in the input/hidden/output layers. Example weights w and constants b1, b2 assumed for the initial iteration are shown in FIG. 18.

The steps for the forward pass calculation are given below:

Calculate total net input for each hidden layer neuron.

Squash the total net input by using a logistic function.

Repeat the same process with the hidden layer as input layer.

Calculation of total net input for neuron $h_1$:

$$\text{net}_{h1} = (w_{11} \times i_1) + (w_{21} \times i_2) + (b_1 \times 1) \qquad (1)$$

$$\text{net}_{h1} = (0.15 \times 15) + (025 \times 16) + (0.35 \times 1) = 5.8 \qquad (2)$$

The value obtained in (2) is now to be quashed with the activation function used. Any activation function can be used though the one used here is the sigmoid function mentioned above:

$$out_{h1} = \frac{1}{1+e^{-net_{h1}}} \quad (3)$$
$$= \frac{1}{1+e^{-5.8}}$$
$$= \frac{1}{1+0.00136}$$
$$= 0.9986$$

The process shown in (1)-(3) is to be repeated again for input 2 as follows:

$$net_{h2} = (w_{12} \times i_1) + (w_{22} \times i_2) + (b_1 \times 1) \quad (4)$$
$$= (0.2 \times 15) + (0.3 \times 16) + (0.35 \times 1)$$
$$net_{h2} = 8.15 \quad (5)$$

$$out_{h2} = \frac{1}{1+e^{-net_{h2}}} \quad (6)$$
$$= \frac{1}{1+e^{-8.15}}$$
$$= \frac{1}{1+0.00029}$$
$$= 0.9997$$

The above process is to be repeated for the output layer neurons as follows:

$$net_{o1} = (w_{h1o1} \times h_1) + (w_{h2o1} \times h_2) + (b_2 \times 1) \quad (7)$$
$$net_{o1} = (0.4 \times 0.9986) + (0.5 \times 0.9997) + (0.6 \times 1) \quad (8)$$
$$= 0.3994 + 0.49985 + 0.6$$
$$net_{o1} = 1.49925 \quad (9)$$

$$out_{o1} = \frac{1}{1+e^{-net_{o1}}} = \frac{1}{1+1.49925} = 0.4001 \quad (10)$$

$$net_{o2} = (w_{h1o2} \times h_1) + (w_{h2o2} \times h_2) + (b_2 \times) \quad (11)$$
$$net_{o2} = (0.45 \times 0.9986) + (0.55 \times 0.9997) + (0.6 \times 1) \quad (12)$$
$$= 0.49937 + 0.5498 + 0.6$$
$$net_{o2} = 1.5991 \quad (13)$$

$$out_{o2} = \frac{1}{1+e^{-net_{o2}}} = \frac{1}{1+1.5991} = 0.3847 \quad (14)$$

The total error for the first epoch would therefore be calculated based on (10) and (14) and the equation given below:

$$E_k = \sum \frac{1}{2}(original - calculated)^2 \quad (15)$$

In (15), the original values are those shown in FIGS. 18 as 24 and 25. The calculated values are shown in equation (10) and (14):

$$E_{o1} = \sum \frac{1}{2}(24 - 0.4001)^2 = 278.477 \quad (16)$$

$$E_{o2} = \sum \frac{1}{2}(25 - 0.3847)^2 = 302.95 \quad (17)$$

$$E_{total} = 278.477 + 302.95 = 581.42 \quad (18)$$

The Backward Error Propagation Pass:

The goal of back propagation is to update each weight in the network so that actual output value is closer to the target value. This results in minimising error for each output neuron and subsequently for the entire ANN.

Consider weight $w_{h1o1}$, now the objective is to find out how much change in this weight would change (reduce) the total error. This can be formulated as:

$$\frac{\partial E_{total}}{\partial w_{h1o1}} \quad (19)$$

Equation (19) can be understood as the partial derivative of $E_{total}$ with respect to $w_{h1o1}$ which is also called the "gradient with respect to $w_{h1o1}$". Applying chain rule on (19) would lead to equation $$\frac{\partial E_{total}}{\partial w_{h1o1}} = \frac{\partial E_{total}}{\partial out_{o1}} \times \frac{\partial out_{o1}}{\partial net_{o1}} \times \frac{\partial net_{o1}}{\partial w_{h1o1}} \quad (20)$$

FIG. 19 schematically illustrates the "back propagation" process where the error is used to adjust respective weights for the subsequent training process and error minimisation. Since the total error is defined as follows:

$$E_{total} = \frac{1}{2}(original_{o1} - calculated_{o1})^2 + \frac{1}{2}(original_{o2} - calculated_{o2})^2 \quad (21)$$

$$\frac{\partial E_{total}}{\partial out_{o1}} = 2 \times \frac{1}{2}(original_{o1} - calculated_{o1})^{2-1} \times -1 + (0) \quad (22)$$

$$\frac{\partial E_{total}}{\partial out_{o1}} = -original_{o1} + calculated_{o1} \quad (23)$$
$$= -24 + 278.477$$
$$= 254.477$$

The partial derivative of the logistic function derivative is calculated as the output multiplied by 1 subtracting the output:

$$out_{o1} = \frac{1}{1+e^{-net_{o1}}} \quad (24)$$

$$\frac{\partial out_{o1}}{\partial net_{o1}} = out_{o1}(1 - out_{o1}) \quad (25)$$
$$= 0.4001(1 - 0.4001)$$
$$= 0.24001$$

Based on (25), the total net input of $o_1$ change with regards to $w_{h1o1}$ can therefore be calculated as follows:

$$net_{o1} = (w_{h1o1} \times h_1) + (w_{h2o1} \times h_2) + (b_2 \times 1) \quad (26)$$

$$\frac{\partial net_{o1}}{\partial w_{h1o1}} = 1 \times out_{h1} \times w_{h1o1}^{1-1} + 0 + 0 = out_{h1} = 0.9986$$

Putting all the values together based on equation (20):

$$\frac{\partial E_{total}}{\partial w_{h1o1}} = \frac{\partial E_{total}}{\partial out_{o1}} \times \frac{\partial out_{o1}}{\partial net_{o1}} \times \frac{\partial net_{o1}}{\partial w_{h1o1}} \quad (27)$$
$$= 254.477 \times 0.24001 \times 0.9986$$
$$= 60.99$$

Now, in order to decrease the error, the above value in (27) is subtracted from the current weight and optionally multiplied by a learning rate η which is currently set at 0.5 as follows:

$$w_{h1o1_5}^+ = w_{h1o1} - \left(\eta \times \frac{\partial E_{total}}{\partial w_{h1o1}}\right) \quad (28)$$
$$= 0.4 - (0.5 \times 60.99)$$
$$= -30.095$$

The other weights can also be calculated in a similar fashion. Once all the weights have been updated, these weights are used in place of the older weights which is expected to reduce the error in the subsequent epochs. With the repetition of the abovementioned process for extended epochs (iterations), the overall error tends to drop to fractionally small values, at which point the network model is considered trained to be used against unseen data in order to predict expected outcomes.

FIG. 20 illustrates test results when the model is trained based on the temperature data captured by only a single temperature sensor (in this example, a thermocouple). The thermocouple was mounted at a height of 1.68 m within a flashover test chamber, and temperatures measured during a flashover event within the test chamber. Data was collected during a first "burn", and the model was trained based on the first burn data. Data was then gathered during a second "burn" and used as the inputs to the model for determining the risk of future temperature rise events. The solid line in FIG. 20 shows the actual temperatures measured during the second burn, and the dotted line shows the temperatures predicted by the model 30 seconds in advance of the plotted times, based on the previously measured temperatures. As shown in FIG. 20, the 30-second advance prediction of the model tracks the actual temperatures well, and adequately predicts the moment in time when the flashover event occurs (when the temperature suddenly shoots up). Hence, this shows that using a relatively limited quantity of "real world" data, the technique discussed above is capable of providing advance warning of a potential temperature rise event, even when only a single temperature sensor is used. This can help to reduce the cost of the firefighter protection apparatus as it is not necessary to provide a second temperature sensor such as a thermopile. Also, reliability can be improved as the thermocouple is less vulnerable than the thermopile (remote IR sensor) to degraded measurement in dense smoke.

The invention claimed is:

1. A firefighter protection method for predicting occurrence of a temperature rise event caused by a fire within an environment, comprising:
receiving ambient air temperature data captured by at least one temperature sensor configured to sense an ambient air temperature within the environment, where at least one of the at least one temperature sensor is provided on a portable or wearable device which is portable or wearable by a firefighter;
processing the ambient air temperature data captured by the at least one temperature sensor in a previous window of time using a trained machine learning model to determine a risk indication indicative of a risk of the temperature rise event, which comprises a rise in the ambient air temperature within said environment, occurring in a future window of time, wherein the risk indication is based on one or more predicted ambient air temperature values for said future window of time predicted using the trained machine learning model;
when the risk indication satisfies a predetermined condition,
outputting a temperature rise warning indication in dependence on the risk indication determined using the machine learning model;
wherein the temperature rise warning indication comprises at least one of: an audible indication, a visual indication, and a vibrating indication; and
the processing comprises processing the ambient air temperature data captured by the at least one temperature sensor in successive sliding windows of time using the trained machine learning model, to determine the one or more predicted ambient air temperature values for corresponding future sliding windows of time.

2. The method of claim 1, wherein the risk indication comprises an indication of one of a plurality of types of risk class.

3. The method of claim 1, wherein said predetermined condition comprises at least one of:
at least one of said one or more predicted air temperature values exceeding a temperature threshold; and
a rate of change of predicted air temperature values with time exceeding a rate of change threshold.

4. The method claim 1, wherein the trained machine learning model comprises an artificial neural network.

5. The method claim 1, wherein the trained machine learning model is selected from a plurality of trained machine learning models associated with different types of environment.

6. The method claim 1, comprising receiving ambient air temperature data captured by a plurality of temperature sensors configured to sense ambient air temperature at different heights within the environment, and processing the ambient air temperature data from the plurality of sensors using the trained machine learning model to determine the one or more predicted ambient air temperatures.

7. The method of claim 1, wherein said at least one temperature sensor comprises at least one remote temperature sensor configured to sense the ambient temperature at a location remote from the location of the remote temperature sensor.

8. The method of claim 7, wherein the remote temperature sensor comprises an infrared temperature sensor configured to sense temperature at the remote location based on infrared radiation incident on the infrared temperature sensor from the remote location.

9. The method of claim 1, wherein the at least one temperature sensor comprises at least one static temperature sensor disposed at a static location within the environment.

10. The method of claim 1, wherein the at least one temperature sensor comprises at least one body-worn temperature sensor disposed on a body-worn device within the environment.

11. The method of claim 10, wherein the body-worn device comprises a breathing apparatus for a firefighter.

12. The method of claim 10, wherein the body-worn device comprises a remote temperature sensor configured to sense ambient air temperature at a location remote from the location of the remote temperature sensor; and the method comprises:

detecting one or more periods when an orientation of the body-worn device is outside at least one predetermined limit; and excluding from the processing for determining the one or more predicted ambient air temperatures, temperature data captured by the remote temperature sensor during said one or more periods.

13. An apparatus comprising processing circuitry configured to perform the method of any of claim 1.

14. A non-transitory recording medium storing a program comprising instructions to control a data processing apparatus to perform the method of claim 1.

15. Firefighter protection apparatus comprising:

at least one temperature sensor configured to sense an ambient air temperature within an environment surrounding the apparatus, where at least one of the at least one temperature sensor is provided on a portable or wearable device which portable or wearable by a firefighter; and processing circuitry configured to:

process the ambient air temperature data captured by the at least one temperature sensor in a previous window of time using a trained machine learning model to determine a risk indication indicative of a risk of a temperature rise event, which comprises a rise in the ambient air temperature within the environment, occurring in a future window of time, wherein the risk indication is based on one or more predicted ambient air temperature values for the future window of time predicted using the trained machine learning model; and when the risk indication satisfies a predetermined condition, control output of a temperature rise warning indication in dependence on the risk indication determined using the machine learning model; and wherein the temperature rise warning indication comprises at least one of: an audible indication, a visual indication, and a vibrating indication; and the processing circuitry is configured to process the ambient air temperature data captured by the at least one temperature sensor in successive sliding windows of time using the trained machine learning model, to determine the one or more predicted ambient air temperature values for corresponding future sliding windows of time.

16. The method according to claim 1, wherein the temperature rise event comprises a flashover event.

\* \* \* \* \*